(12) United States Patent
Tang et al.

(10) Patent No.: US 11,747,431 B2
(45) Date of Patent: Sep. 5, 2023

(54) VEHICLE POSITIONING METHOD AND APPARATUS, AND VEHICLE

(71) Applicant: BOE TECHNOLOGY GROUP CO., LTD., Beijing (CN)

(72) Inventors: Hao Tang, Beijing (CN); Jiuyang Cheng, Beijing (CN); Lijia Zhou, Beijing (CN); Quanguo Zhou, Beijing (CN); Lirong Xu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 21 days.

(21) Appl. No.: 17/615,482

(22) PCT Filed: Dec. 30, 2020

(86) PCT No.: PCT/CN2020/141734
§ 371 (c)(1),
(2) Date: Nov. 30, 2021

(87) PCT Pub. No.: WO2021/136445
PCT Pub. Date: Jul. 8, 2021

(65) Prior Publication Data
US 2022/0236364 A1    Jul. 28, 2022

(30) Foreign Application Priority Data

Jan. 2, 2020   (CN) .......................... 202010001929.1

(51) Int. Cl.
*G01S 3/02*       (2006.01)
*G01S 5/02*       (2010.01)
(Continued)

(52) U.S. Cl.
CPC .......... *G01S 5/0284* (2013.01); *G01S 5/0072* (2013.01); *G01S 5/0226* (2013.01); *G01S 5/14* (2013.01)

(58) Field of Classification Search
CPC .... G01S 5/0284; G01S 5/0072; G01S 5/0226; G01S 5/14; G01S 3/02
(Continued)

(56) References Cited

U.S. PATENT DOCUMENTS 10,353,048 B2   7/2019 Oh et al.
2011/0292819 A1  12/2011 Ekbal et al.
(Continued)

FOREIGN PATENT DOCUMENTS

CN    102466792 A    5/2012
CN    102540143 A    7/2012
(Continued)

OTHER PUBLICATIONS

First Office Action for the Chinese Patent Application No. 202010001929.1 issued by the Chinese Patent Office dated Apr. 21, 2023.

*Primary Examiner* — Harry K Liu
(74) *Attorney, Agent, or Firm* — IP & T GROUP LLP

(57) ABSTRACT

The present disclosure provides a vehicle positioning method, including: a first controller synchronously controlling each first beacon node to send a detection initial signal; a second controller determining a target beacon node among second beacon nodes and controlling the target beacon node to send a detection feedback signal; the first controller synchronously controlling each first beacon node to send a corresponding detection signal to be responded and recording a first moment of sending the detection signal to be responded; the second controller controlling the target beacon node to send a detection response signal; the first controller recording a second moment of receiving the detection response signal and determining a distance between each first beacon node and the target beacon node according to the first moment and the second moment, so as
(Continued)

to determine a position of the target beacon node relative to the first vehicle.

20 Claims, 17 Drawing Sheets

(51) Int. Cl.
  *G01S 5/14* (2006.01)
  *G01S 5/00* (2006.01)
(58) Field of Classification Search
  USPC .......................................................... 342/451
  See application file for complete search history.

(56) References Cited

U.S. PATENT DOCUMENTS

| | | |
|---|---|---|
| 2012/0112895 A1 | 5/2012 | Jun |
| 2015/0029873 A1 | 1/2015 | Subramanian et al. |
| 2016/0277196 A1 | 9/2016 | Jose et al. |
| 2016/0282447 A1 | 9/2016 | Amizur et al. |
| 2019/0179004 A1 | 6/2019 | Okada |
| 2019/0385452 A1 * | 12/2019 | Nangeroni ............. G08G 1/202 |

FOREIGN PATENT DOCUMENTS

| | | | | |
|---|---|---|---|---|
| CN | 102906590 A | | 1/2013 | |
| CN | 103931249 A | | 7/2014 | |
| CN | 104656058 A | * | 5/2015 | |
| CN | 105408763 A | | 3/2016 | |
| CN | 106954188 A | | 7/2017 | |
| CN | 107172147 A | | 9/2017 | |
| CN | 107430190 A | | 12/2017 | |
| CN | 109307861 A | | 2/2019 | |
| CN | 109872567 A | | 6/2019 | |
| CN | 110113788 A | | 8/2019 | |
| EP | 3367713 A1 | * | 8/2018 | ........... B60R 16/023 |
| JP | 2017161430 A | | 9/2017 | |
| WO | WO-2018139773 A1 | * | 8/2018 | ............. G01S 11/06 |

* cited by examiner

VEHICLE POSITIONING METHOD AND APPARATUS, AND VEHICLE

CROSS-REFERENCE TO RELATED APPLICATIONS

This application is a national phase entry under 35 USC 371 of International Patent Application No. PCT/CN2020/141734, filed on Dec. 30, 2020, which claims priority to Chinese Patent Application No. 202010001929.1, filed on Jan. 2, 2020, which are incorporated herein by reference in their entirety.

TECHNICAL FIELD

The present disclosure relates to the field of vehicles, and in particular to a vehicle positioning method and apparatus, and a vehicle.

BACKGROUND

During a running process of a vehicle, a relative distance between the vehicle and surrounding vehicles thereof may be measured through measurement manners such as video ranging, radar ranging, laser ranging, and ultrasonic ranging at present, so that users can be alert to surrounding vehicles that exceed a safe distance in time to ensure a safe driving for the users and reduce a probability of vehicle accidents.

SUMMARY

In an aspect, a vehicle positioning method is provided, which is applied to vehicles each provided with a vehicle positioning apparatus. A vehicle positioning apparatus includes a controller and at least four beacon nodes coupled thereto, and at least each of four corners of a vehicle is provided with one beacon node thereon. The vehicle positioning method is used to determine a position of a second vehicle relative to a first vehicle. The controller of the vehicle positioning apparatus provided on the first vehicle is a first controller, and the at least four beacon nodes of the vehicle positioning apparatus provided on the first vehicle are at least four first beacon nodes; and the controller of the vehicle positioning apparatus provided on the second vehicle is a second controller, and the at least four beacon nodes of the vehicle positioning apparatus provided on the second vehicle are at least four second beacon nodes.

The vehicle positioning method includes:

synchronously controlling, by the first controller, each of the at least four first beacon nodes to send a corresponding detection initial signal every other first preset time when the first controller is in an invitation mode upon being started;

selecting, by the second controller, at least one second beacon node each receiving at least m detection initial signals from all the second beacon nodes as at least one second beacon node to be detected; determining, by the second controller, a target beacon node according to signal parameters of the detection initial signals received by each selected second beacon node to be detected; preprocessing, by the second controller, the detection initial signals received by the target beacon node; and controlling, by the second controller, the target beacon node to send a detection feedback signal, so that the second controller is in a second detection mode; wherein m is a positive integer greater than or equal to 3, and the signal parameters include at least signal strengths of the detection initial signals;

determining, by the first controller, that at least m first beacon nodes receive the detection feedback signal, so that the first controller is in a first detection mode in response to the detection feedback signal; synchronously controlling, by the first controller, each of the at least four first beacon nodes to send a corresponding detection signal to be responded according to a preset rule; recording, by the first controller, a first moment when each of the at least four first beacon nodes sends the corresponding detection signal to be responded; and taking, by the first controller, each of the at least m first beacon nodes receiving the detection feedback signal as a test first beacon node;

controlling, by the second controller, the target beacon node to send a detection response signal corresponding to each test first beacon node according to a preprocessing result of the detection initial signals and detection signals to be responded received by the target beacon node based on the preset rule; and recording, by the first controller, a second moment when each test first beacon node receives the corresponding detection response signal; and determining, by the first controller, a distance between each test first beacon node and the target beacon node according to the first moment and the second moment that are corresponding to each test first beacon node, so as to determine a position of the target beacon node relative to the first vehicle.

In some embodiments, the detection initial signal sent by the first beacon node carries a first node identifier of the first beacon node that sends the detection initial signal. Preprocessing, by the second controller, the detection initial signals received by the target beacon node, includes: obtaining, by the second controller, first node identifiers carried by the detection initial signals.

In some embodiments, synchronously controlling, by the first controller, each of the at least four first beacon nodes to send the corresponding detection signal to be responded according to the preset rule, includes: synchronously controlling, by the first controller, each of the at least four first beacon nodes to send the corresponding detection signal to be responded once in the first detection mode; wherein the detection signal to be responded carries the first node identifier of the first beacon node that sends the detection signal to be responded.

In some embodiments, controlling, by the second controller, the target beacon node to send the detection response signal corresponding to each test first beacon node according to the preprocessing result of the detection initial signals and the detection signals to be responded received by the target beacon node based on the preset rule, includes:

after the first controller synchronously controls each of the at least four first beacon nodes to send the corresponding detection signal to be responded once in the first detection mode, sequentially in response to the received detection signals to be responded sent by the at least four first beacon nodes, starting, by the second controller, preset threads corresponding to the detection signals to be responded according to a time sequence in which the target beacon node receives detection signals to be responded sent by the at least four first beacon nodes, wherein a preset thread includes: starting timekeeping, and obtaining the first node identifier carried by the detection signal to be responded; determining whether the first node identifier currently obtained exists in the first node identifiers carried by the detection initial signals; if so, controlling the target beacon node to send the detection response signal when the timekeeping reaches a preset duration, the detection response signal carrying a node identifier of the target beacon node and the first node identifier currently obtained; and deleting the first node identifier currently obtained.

In some embodiments, recording, by the first controller, the second moment when each test first beacon node receives the corresponding detection response signal, includes: for each test first beacon node, determining, by the first controller, whether a first node identifier of the test first beacon node is matched with the first node identifier carried by the detection response signal received by the test first beacon node; when matching is determined, recording, by the first controller, the second moment when the test first beacon node receives the corresponding detection response signal.

In some embodiments, the detection initial signal sent by the first beacon node carries a first node identifier of the first beacon node that sends the detection initial signal. Preprocessing, by the second controller, the detection initial signals received by the target beacon node, and controlling, by the second controller, the target beacon node to send the detection feedback signal, includes: obtaining, by the second controller, first node identifiers carried by the detection initial signals; sequencing, by the second controller, the obtained first node identifiers to obtain a sequencing result; and controlling, by the second controller, the target beacon node to send the detection feedback signal carrying the sequencing result.

In some embodiments, synchronously controlling, by the first controller, each of the at least four first beacon nodes to send the corresponding detection signal to be responded according to the preset rule, includes: synchronously controlling, by the first controller, each of the at least four first beacon nodes to send the corresponding detection signal to be responded at least m times in the first detection mode; wherein the detection signal to be responded carries the first node identifier of the first beacon node that sends the detection signal to be responded.

In some embodiments, controlling, by the second controller, the target beacon node to send the detection response signal corresponding to each test first beacon node according to the preprocessing result of the detection initial signals and the detection signals to be responded received by the target beacon node based on the preset rule, includes:

after the first controller synchronously controls each of the at least four first beacon nodes to send the corresponding detection signal to be responded a k-th time in the first detection mode, obtaining, by the second controller, first node identifiers carried by the detection signals to be responded received by the target beacon node;

starting, by the second controller, timekeeping when determining that a first node identifier currently obtained is sequenced at a k-th position in the sequencing result; controlling, by the second controller, the target beacon node to send the detection response signal when the timekeeping reaches a preset duration, the detection response signal carrying a node identifier of the target beacon node; wherein k takes a value in a positive integer set of [1, m] in sequence.

In some embodiments, recording, by the first controller, the second moment when each test first beacon node receives the corresponding detection response signal, includes: obtaining, by the first controller, the sequencing result carried by the detection feedback signal; and recording, by the first controller, the second moment when a test first beacon node to which the first node identifier sequenced at the k-th position in the sequencing result belongs receives the detection response signal.

In some embodiments, the at least one second beacon node to be detected includes a plurality of second beacon nodes to be detected, after the first controller determines the position of the target beacon node relative to the first vehicle, the method further includes: taking, by the second controller, each remaining second beacon node to be detected on the second vehicle as the target beacon node; determining, by the first controller, a position of each remaining second beacon node to be detected relative to the first vehicle according to each target beacon node determined by the second controller; and obtaining, by the first controller, position information of the second vehicle relative to the first vehicle according to the position of each second beacon node to be detected relative to the first vehicle.

In some embodiments, the first controller is in the invitation mode after obtaining the position information of the second vehicle relative to the first vehicle.

In some embodiments, after the first controller synchronously controls each of the at least four first beacon nodes to send the corresponding detection initial signal, the method further includes: determining, by the second controller, whether second beacon nodes receiving less than m detection initial signals exist among all the second beacon nodes; if not, selecting, by the second controller, two second beacon nodes receiving two detection initial signals from all the second beacon nodes as two second beacon nodes to be detected; and controlling, by the second controller, the two second beacon nodes to be detected to send detection feedback signals; taking, by the first controller, two first beacon nodes receiving the detection feedback signals sent by the two second beacon nodes to be detected as two test first beacon nodes to detect a distance value between each of the two test first beacon nodes and each of the two second beacon nodes to be detected; calculating, by the first controller, a deflection angle of the second vehicle relative to the first vehicle according to the detected distance value, a distance value between the two test first beacon nodes and a distance value between the two second beacon nodes to be detected; and obtaining, by the first controller, position information of the second vehicle relative to the first vehicle according to the detected distance value, the calculated deflection angle, and a pre-associated position relationship between all the second beacon nodes provided on the second vehicle.

In some embodiments, after the first controller is in the first detection mode in response to the detection feedback signal, the method further includes: obtaining, by the first controller, distance values between each of the at least four first beacon nodes and the second vehicle at a third moment and a fourth moment; determining, by the first controller, a movement direction of the second vehicle relative to the first vehicle according to a distance value between each of the at least four first beacon nodes and the second vehicle at the third moment and a distance value between each of the at least four first beacon nodes and the second vehicle at the fourth moment; wherein a time difference between the third moment and the fourth moment is less than a first time threshold.

In some embodiments, the detection feedback signal sent by the target beacon node carries an identifier of the second vehicle. Before the first controller obtains the distance value between each of the at least four first beacon nodes and the second vehicle at the fourth moment, the method further includes: determining, by the first controller, whether the identifier of the second vehicle carried by the detection feedback signal received at the third moment is the same as the identifier of the second vehicle carried by the detection feedback signal received at the fourth moment. Determining, by the first controller, the movement direction of the second vehicle relative to the first vehicle according to the distance value between each of the at least four first beacon nodes and the second vehicle at the third moment and the distance value between each of the at least four first beacon nodes and the second vehicle at the fourth moment, includes: in response to determining that the identifier of the second vehicle carried by the detection feedback signal received at the third moment is the same as the identifier of the second vehicle carried by the detection feedback signal received at the fourth moment, determining, by the first controller, the movement direction of the second vehicle relative to the first vehicle according to the distance value between each of the at least four first beacon nodes and the second vehicle at the third moment and the distance value between each of the at least four first beacon nodes and the second vehicle at the fourth moment.

In some embodiments, after the first controller is in the first detection mode in response to the detection feedback signal, the method further includes: obtaining, by the first controller, a first position of the second vehicle relative to the first vehicle at a fifth moment; obtaining, by the first controller, a second position of the second vehicle relative to the first vehicle at a sixth moment; and determining, by the first controller, a relative speed of the second vehicle to the first vehicle according to the first position, the second position, and a time difference between the fifth moment and the sixth moment; wherein a time difference between the fifth moment and the sixth moment is greater than or equal to a second time threshold.

In some embodiments, the detection feedback signal sent by the target beacon node carries an identifier of the second vehicle. Before the first controller obtains the second position of the second vehicle relative to the first vehicle at the sixth moment, the method further includes: determining, by the first controller, whether the identifier of the second vehicle carried by the detection feedback signal received at the fifth moment is the same as the identifier of the second vehicle carried by the detection feedback signal received at the sixth moment. Determining, by the first controller, the relative speed of the second vehicle to the first vehicle according to the first position, the second position, and the time difference between the fifth moment and the sixth moment, includes: in response to determining that the identifier of the second vehicle carried by the detection feedback signal received at the fifth moment is the same as the identifier of the second vehicle carried by the detection feedback signal received at the sixth moment, determining, by the first controller, the relative speed of the second vehicle to the first vehicle according to the first position, the second position, and the time difference between the fifth moment and the sixth moment.

In some embodiments, after the first controller synchronously controls each of the at least four first beacon nodes to send the corresponding detection initial signal, determining, by the first controller, that the detection feedback signal from the target beacon node on the second vehicle is not received within a second preset time, so that the first controller is in the invitation mode; and after the first controller synchronously controls each of the at least four first beacon nodes to send the corresponding detection signal to be responded, determining, by the first controller, that the detection response signal from the target beacon node on the second vehicle is not received within the second preset time, so that the first controller is in the invitation mode.

In some embodiments, after the second controller controls the target beacon node to send the detection feedback signal or the detection response signal, determining, by the second controller, that the detection signal to be responded from any of the at least four first beacon nodes on the first vehicle is not received within a third preset time, so that the second controller is in an invitation mode.

In some embodiments, the detection initial signal and the detection signal to be responded that are sent by the first beacon node and the detection feedback signal and the detection response signal that are sent by the second beacon node each have a pulse duration of 100 ps to 2 ns.

In another aspect, a vehicle positioning apparatus is provided, including a first controller and at least four first beacon nodes coupled thereto. At least each of four corners of a first vehicle provided with the vehicle positioning apparatus is provided with one first beacon node thereon. The first controller includes: a first synchronization circuit coupled to the at least four first beacon nodes and configured to synchronously control each of the at least four first beacon nodes to send a corresponding detection initial signal; and a first processing circuit configured to be in an invitation mode upon being started, and trigger the first synchronization circuit to synchronously control each of the at least four first beacon nodes to send the corresponding detection initial signal every other first preset time; The first synchronization circuit is further configured to control each of the at least four first beacon nodes to receive a detection feedback signal from a second vehicle and send the detection feedback signal to the first processing circuit. The first processing circuit is further configured to determine that at least m first beacon nodes receive the detection feedback signal, so that the first controller is in a first detection mode in response to the detection feedback signal; trigger the first synchronization circuit to synchronously control each of the at least four first beacon nodes to send a corresponding detection signal to be responded according to a preset rule, record a first moment when each of the at least four first beacon nodes sends the corresponding detection signal to be responded; and take each of the at least four first beacon nodes receiving the detection feedback signal as a test first beacon node, wherein m is a positive integer greater than or equal to 3.

The first synchronization circuit is further configured to control each test first beacon node to receive a detection response signal from a target beacon node of the second vehicle and send the detection response signal to the first processing circuit. The first processing circuit is further configured to record a second moment when each test first beacon node receives the detection response signal corresponding to the detection signal to be responded sent by the test first beacon node; determine a distance between each test first beacon node and the target beacon node according to the first moment and the second moment that are corresponding to each test first beacon node, so as to determine a position of the target beacon node relative to the first vehicle.

In some embodiments, the first processing circuit is configured to trigger the first synchronization circuit to synchronously control each of the at least four first beacon nodes to send the corresponding detection signal to be responded according to the preset rule, a number of times that the first processing circuit triggers the first synchronization circuit to perform a synchronization control action being one in the first detection mode; wherein the detection signal to be responded carries a first node identifier of the first beacon node that sends the detection signal to be responded; and for each test first beacon node, determine whether a node identifier of the test first beacon node is matched with a first node identifier carried by the detection response signal received by the test first beacon node; when matching is determined, record the second moment when the test first beacon node receives the corresponding detection response signal.

In some embodiments, the first processing circuit is configured to: trigger the first synchronization circuit to synchronously control each of the at least four first beacon nodes to send the corresponding detection signal to be responded according to the preset rule, a number of times that the first processing circuit triggers the first synchronization circuit to perform the synchronization control action being m in the first detection mode; wherein the detection signal to be responded carries a first node identifier of the first beacon node that sends the detection signal to be responded; and obtain a sequencing result carried by the detection feedback signal; record the second moment when a test first beacon node to which the first node identifier sequenced at a k-th position in the sequencing result belongs receives the detection response signal after triggering the first synchronization circuit to perform the synchronization control action a k-th time in the first detection mode; wherein k takes a value in a positive integer set of [1, m] in sequence.

In some embodiments, a position of each remaining second beacon node to be detected relative to the first vehicle is determined according to the target beacon node determined by the second vehicle among remaining second beacon nodes to be detected; and position information of the second vehicle relative to the first vehicle is obtained according to a position of each second beacon node to be detected relative to the first vehicle.

In yet another aspect, a vehicle positioning apparatus is provided, including a second controller and at least four second beacon nodes coupled thereto.

At least each of four corners of a second vehicle provided with the vehicle positioning apparatus is provided with one second beacon node thereon.

The second control controller includes:

a second synchronization circuit coupled to the at least four second beacon nodes and configured to control each second beacon node to receive detection initial signals from a first vehicle and send the detection initial signals to a second processing circuit;

the second processing circuit being configured to receive the detection initial signals from the second synchronization circuit, select at least one second beacon node receiving m detection initial signals from all the second beacon nodes as at least one second beacon node to be detected; determine a target beacon node according to signal parameters of the detection initial signals received by each selected second beacon node to be detected; preprocess the received detection initial signals, and trigger the second synchronization circuit to control the target beacon node to send a detection feedback signal, so that the second controller is in a second detection mode; where m is a positive integer greater than or equal to 3, and the signal parameters include at least signal strengths of the detection initial signals.

The second synchronization circuit is further configured to control the target beacon node to receive detection signals to be responded from the first vehicle, and send the detection signals to be responded to the second processing circuit.

The second processing circuit is further configured to trigger the second synchronization circuit to control the target beacon node to send a detection response signal corresponding to each test first beacon node according to a preprocessing result of the detection initial signals and the detection signals to be responded received by the target beacon node based on a preset rule.

In some embodiments, a detection initial signal sent by a first beacon node carries a first node identifier of the first beacon node that sends the detection initial signal.

The second processing circuit is configured to obtain first node identifiers carried by the detection initial signals received by the target beacon node; and start preset threads corresponding to the detection signals to be responded sequentially in response to the received detection signals to be responded sent by first beacon nodes according to a time sequence of the target beacon node receiving the detection signals to be responded sent by the first beacon nodes.

A preset thread includes:

starting timekeeping, and obtaining a first node identifier carried by a detection signal to be responded;

determining whether the first node identifier currently obtained exists in the first node identifiers carried by the detection initial signals;

if so, triggering the second synchronization circuit to control the target beacon node to send the detection response signal when the timekeeping reaches a preset duration, the detection response signal carrying a node identifier of the target beacon node and the first node identifier currently obtained; and deleting the first node identifier currently obtained.

In some embodiments, a detection initial signal sent by a first beacon node carries a first node identifier of the first beacon node that sends the detection initial signal.

The second processing circuit is configured to: obtain first node identifiers carried by the detection initial signals received by the target beacon node, sequence the obtained first node identifier to obtain a sequencing result; and trigger the second synchronization circuit to control the target beacon node to send the detection feedback signal carrying the sequencing result; and obtain first node identifiers carried by the detection signals to be responded received by the target beacon node; start timekeeping when determining that a first node identifier currently obtained is sequenced at a k-th position in the sequencing result; and trigger the second synchronization circuit to control the target beacon node to send the detection response signal when the timekeeping reaches a preset duration, the detection response signal carrying a node identifier of the target beacon node; wherein k takes a value in a positive integer set of [1, m] in sequence.

In yet another aspect, a vehicle is provided, including the vehicle positioning apparatus as described in any of the above embodiments.

In yet another aspect, a non-transitory computer-readable storage medium is provided. The non-transitory computer-readable storage medium has stored thereon computer program instructions that, when run by a processor, perform one or more steps in the vehicle positioning method as described in any of the above embodiments.

In yet another aspect, a computer program product is provided. The computer program product includes computer program instructions which are stored in a non-transitory computer-readable storage medium, when the computer program instructions are executed on a computer, the computer program instructions, cause the computer to perform one or more steps in the vehicle positioning method as described in any of the above embodiments.

In yet another aspect, a computer program is provided. The computer program is stored in a non-transitory computer-readable storage medium. When executed on a computer, the computer program causes the computer to execute one or more steps in the vehicle positioning method as described in any of the above embodiments.

BRIEF DESCRIPTION OF THE DRAWINGS

In order to describe technical solutions in the present disclosure more clearly, the accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and an actual timing of a signal to which the embodiments of the present disclosure relate.

DETAILED DESCRIPTION

Figure 1:
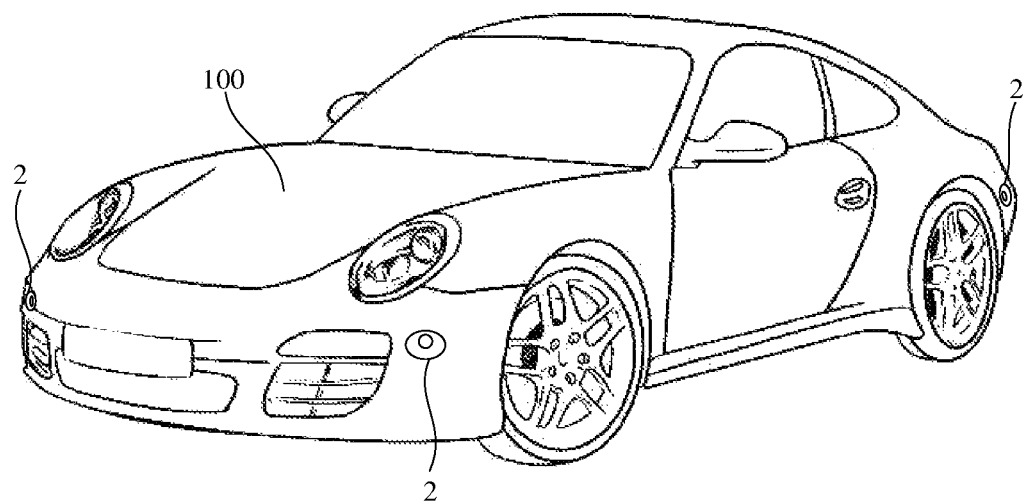
FIG. 1 is a schematic diagram of an installation of beacon nodes on a vehicle, in accordance with some embodiments.

Technical solutions in some embodiments of the present disclosure will be described clearly and completely below with reference to the accompanying drawings. Obviously, the described embodiments are merely some but not all embodiments of the present disclosure. All other embodiments obtained on the basis of the embodiments of the present disclosure by a person of ordinary skill in the art without paying any creative effort shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to." In the description of the specification, terms such as "some embodiments", "exemplary embodiments", "example", "some examples" are intended to indicate that specific features, structures, materials or characteristics related to the embodiment(s) or example(s) are included in at least one embodiment or example of the present disclosure. Schematic representations of the above terms do not necessarily refer to the same embodiment(s) or example(s). In addition, the specific features, structures, materials, or characteristics may be included in any one or more embodiments or examples in any suitable manner.

Hereinafter, the terms "first", "second", "third", "fourth", "fifth" and "sixth" are used for descriptive purposes only, and are not to be construed as indicating or implying relative importance or implicitly indicating the number of indicated technical features. Thus, features defined by "first", "second", "third", "fourth", "fifth" or "sixth" may explicitly or implicitly include one or more of the features. In the description of the embodiments of the present disclosure, the term "a plurality of" or "the plurality of" means two or more unless otherwise specified.

In the description of some embodiments, the term "coupled" and derivatives thereof may be used. For example, the term "coupled" may be used in the description of some embodiments to indicate that two or more components are in direct or indirect contact with each other.

As used herein, depending on the context, the term "if" is optionally construed as "when" or "in a case where" or "in response to determining that" or "in response to detecting". Similarly, depending on the context, the phrase "if it is determined that" or "if [a stated condition or event] is detected" is optionally construed as "in a case where it is determined that" or "in response to determining that" or "in a case where [the stated condition or event] is detected" or "in response to detecting [the stated condition or event]".

The use of the phrase "applicable to" or "configured to" herein means an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

At present, during a running process of a vehicle, a distance and a relative position between the vehicle and surrounding vehicles thereof may be monitored by means of video ranging, radar ranging, laser ranging and ultrasonic ranging, so as to ensure a safe driving for users and reduce the probability of vehicle accidents. However, in actual situations, the above monitoring methods have many limitations.

For example, the video ranging needs to obtain images of surroundings of the vehicle, then process the images, and determine a relative distance between vehicles according to processing results. In actual situations, a process of processing images is relatively complicated, and imaging results of the images are affected by many factors. For example, the imaging results of the images may be affected by a shooting angle, such as an incomplete target object in a shot image. For another example, the imaging results are affected by outdoor ambient light, such as dark outdoor light. For yet another example, the imaging results are affected by some special road conditions, e.g., when entering and exiting a tunnel, a camera may have underexposure and overexposure problems due to a sudden change of light, and the imaging results are displayed as all white or all black in a picture. For yet another example, the imaging results are affected by weather factors, e.g., rain will affect the imaging, and the image is mostly blurred. The above influences lead to poor imaging quality of the images, which directly affects accuracy of measurement results and results in low accuracy of the measurement results.

For other measurement methods, an equipment of laser ranging has high cost, and laser signals are sent directionally, but a position of a moving vehicle is changing all the time, and thus the laser ranging is not suitable for monitoring a relative position and distance between moving vehicles. In addition, since the laser ranging needs to send and process laser signals, the equipment of the laser ranging has high cost.

A problem of high cost of an equipment also exists in the radar ranging. In addition, a sound velocity of ultrasound changes with changes in air temperature and humidity. A measurement environment for monitoring the relative position or distance between the vehicle and surrounding vehicles thereof is generally outdoors, and temperature and humidity of the outdoor environment are affected by weather and other factors. Therefore, monitoring the relative position or distance between the vehicle and the surrounding vehicles thereof by means of ultrasonic ranging also has a problem of low accuracy of measurement results.

Figure 2:
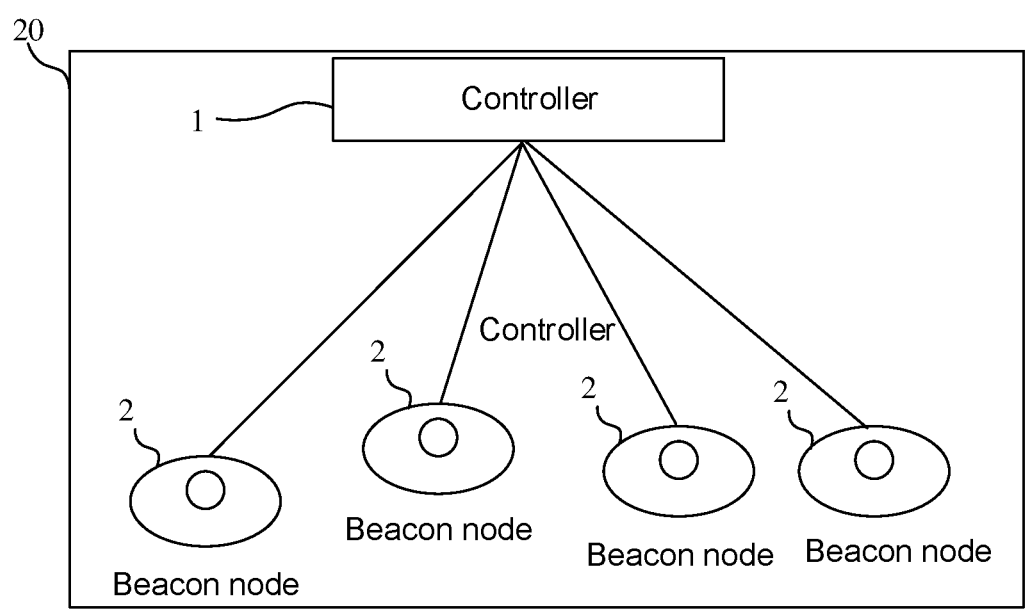
FIG. 2 is a schematic diagram of hardware of a vehicle positioning apparatus, in accordance with some embodiments.

Based on the problems of the above measurement methods, as shown in FIGS. 1 and 2, some embodiments of the present disclosure provide a vehicle positioning method, which is applied to vehicles 100 each provided with a vehicle positioning apparatus 20. The vehicle positioning apparatus 20 includes a controller 1 and at least four beacon nodes 2 coupled thereto, and at least each of four corners of the vehicle 100 is provided with one beacon node 2 thereon. Referring to FIG. 1, FIG. 1 can only show that each of three corners of the vehicle 100 is provided with one beacon node 2 thereon, and a corner that is obscured of the vehicle is also provided with one beacon node thereon.

The following describes an arrangement of various components of the vehicle positioning apparatus on the vehicle.

FIG. 2 shows a structural diagram of hardware of the vehicle positioning apparatus 20. Referring to FIG. 2, the vehicle positioning apparatus 20 includes the controller 1 and at least four beacon nodes 2 coupled thereto. For example, FIG. 2 only shows four beacon nodes 2. In a specific implementation, the number of beacon nodes 2 may be four or more than four.

Figure 3A:
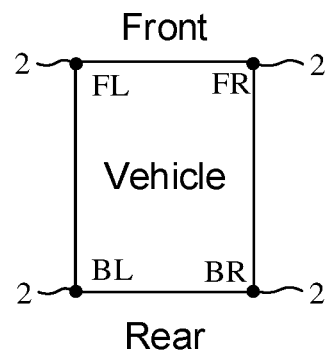
FIG. 3A is a schematic diagram of an arrangement of beacon nodes on a vehicle in a vehicle positioning apparatus, in accordance with some embodiments.
Figure 3B:
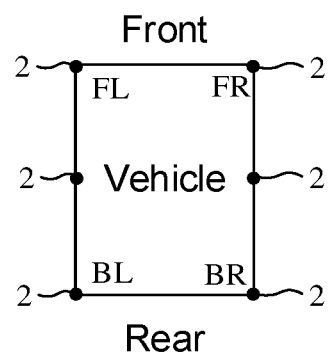
FIG. 3B is a schematic diagram of another arrangement of beacon nodes on a vehicle in a vehicle positioning apparatus, in accordance with some embodiments.

At least four beacon nodes 2 are provided on both sides of the vehicle, and the both sides of the vehicle include at least four corners of the vehicle (i.e., a front left corner FL, a rear left corner BL, a front right corner FR and a rear right corner BR of the vehicle), and at least each of the four corners of the vehicle is provided with one beacon node 2 thereon. FIGS. 3A and 3B each exemplarily show a schematic diagram of an arrangement of at least four beacon nodes 2 on the vehicle 100 in some embodiments of the present disclosure.

For example, FIG. 3A shows an arrangement in which four beacon nodes 2 are provided on the vehicle 100. Referring to FIG. 3A, the number of the beacon nodes 2 is four, and each of the four corners of the vehicle 100 is provided with one beacon node 2 thereon. The beacon nodes 2 are arranged by using the arrangement shown in FIG. 3A. Since positions of the four corners of the vehicle 100 may correspondingly outline the vehicle 100, and the outline of the vehicle 100 may generally reflect a size of the vehicle 100, the arrangement shown in FIG. 3A may provide a determination basis for a driver to determine a size of a front or rear vehicle, which facilitates the driver to take corresponding driving actions in time. For example, if the driver sees that an overall outline of the rear vehicle is large and the vehicle body is long, the driver may determine that the vehicle is large, and can consider whether it is necessary to change lanes, etc.

For example, FIG. 3B shows another arrangement in which at least four beacon nodes 2 are provided on the vehicle 100. Referring to FIG. 3B, the number of the beacon nodes 2 is six (i.e., the number of the beacon nodes 2 is more than 4), each of four corners of the vehicle 100 is provided with one beacon node 2 thereon, and in addition to the beacon nodes 2 provided on the four corners of the vehicle 100, each of two sides of the vehicle 100 is also provided with one beacon node 2 thereon.

It will be understood that the above arrangements of the beacon nodes 2 are only exemplary. In the specific implementation, the arrangements of the beacon nodes 2 include but are not limited to the above arrangements. For example, the number of the beacon nodes 2 may also be five, seven, etc., as long as the number of the beacon nodes 2 is more than or equal to four.

An installation position of each beacon node 2 on the vehicle 100 may be determined when the beacon node 2 is produced. For example, a node identifier of each beacon node 2 may be associated with position information of an installation position of the beacon node 2 in advance, and an outer surface of the beacon node 2 is marked to indicate the installation position corresponding to the position information associated with the node identifier of the beacon node 2, so that a user, when installing the beacon nodes 2, may install the beacon node 2 on a corresponding position on both sides of the vehicle 100 according to a mark on an outer surface of each beacon node 2. For example, when a vehicle positioning apparatus is produced, BL (i.e., position information) for representing a rear left corner (i.e., an installation position) is written in a node identifier of a beacon node 2 of the vehicle positioning apparatus, and the outer surface of the beacon node 2 is marked with words such as "rear left corner" or the like for indicating the installation position. The user may know that the beacon node 2 should be installed at the rear left corner of the vehicle 100 during use.

Or, the installation position of each beacon node 2 on the vehicle 100 may not be determined when the beacon node 2 is produced, but may be set by the user according to actual conditions. For example, position information of a plurality of installation positions may be written in the controller in advance. During use, the user may set any beacon node 2 at any position of the vehicle 100, and then set the position information of the installation position of each beacon node 2 in the controller 1 according to an actual installation position of each beacon node 2. The controller 1 associates the position information of the installation position set by the user for each beacon node 2 with the node identifier of the beacon node 2, so that the position information of the installation position of each beacon node 2 may be accurately obtained in a subsequent positioning process.

In the following description, the vehicle positioning method in embodiments of the present disclosure is used to determine a position of a second vehicle relative to a first vehicle. The controller of the vehicle positioning apparatus provided on the first vehicle is a first controller, and beacon nodes of the vehicle positioning apparatus provided on the first vehicle are first beacon nodes. The controller of the vehicle positioning apparatus provided on the second vehicle is a second controller, and beacon nodes of the vehicle positioning apparatus provided on the second vehicle are second beacon nodes.

Figure 4:
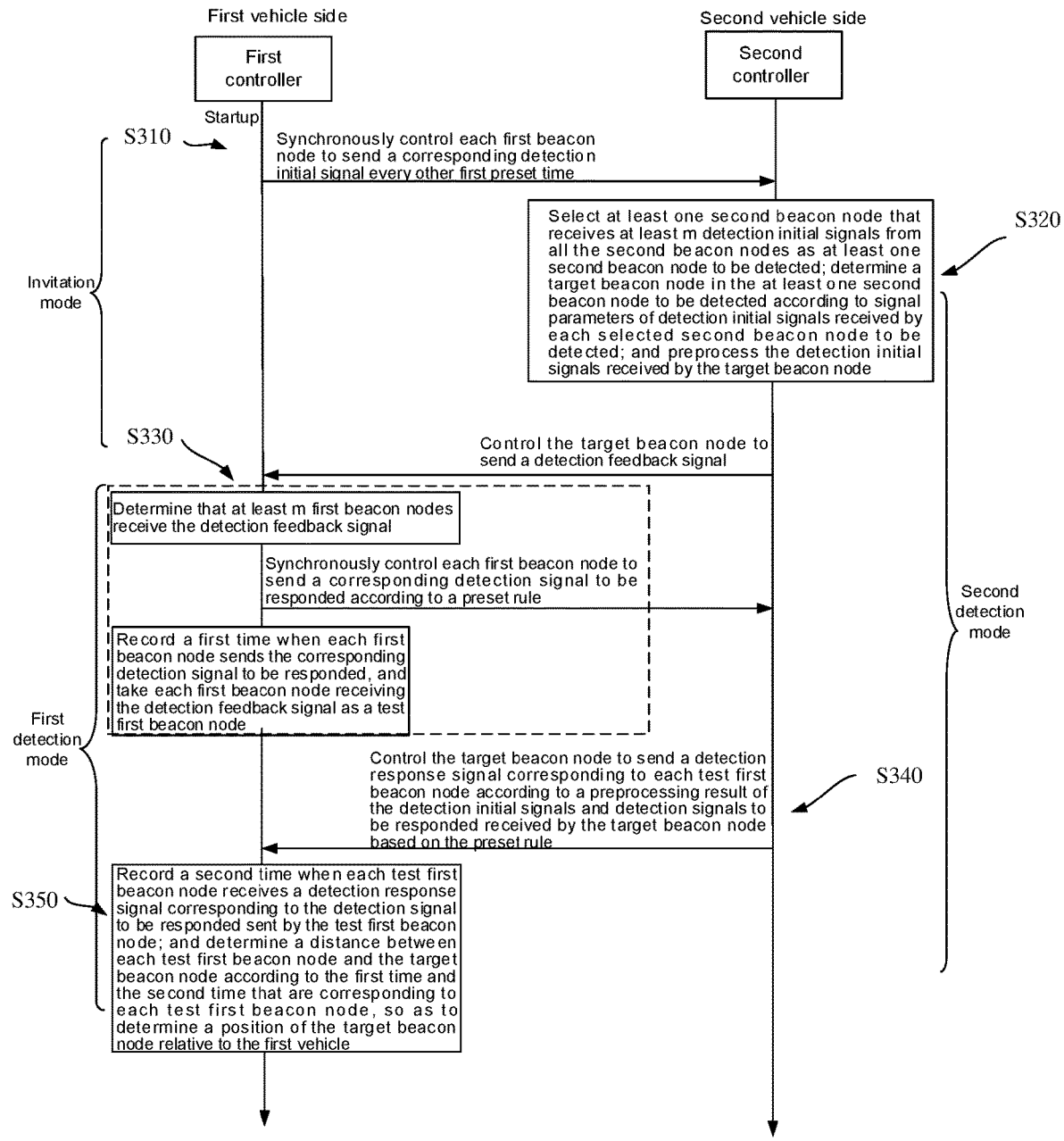
FIG. 4 is a signal flow graph of a vehicle positioning method, in accordance with some embodiments.

Based on the vehicle positioning apparatus, some embodiments of the present disclosure provide a vehicle positioning method, and as shown in FIG. 4, the method includes the following steps.

In S310, the first controller is in an invitation mode upon being started, and synchronously controls each first beacon node to send a corresponding detection initial signal every other first preset time.

The detection initial signal corresponding to each first beacon node may carry a first node identifier of the first beacon node. The first node identifier of each first beacon node is information for uniquely identifying the first beacon node. The detection initial signal may be an impulse radio-ultra wideband (IR-UWB) signal having a pulse duration of 100 ps to 2 ns or a frequency of 3.1 GHz to 10.6 GHz. The first preset time may be set by those skilled in the art according to actual situations, which is not limited in the embodiments of the present disclosure.

In this step, the first controller of the first vehicle is started to be in the invitation mode, and the first controller of the first vehicle may synchronously control each first beacon node on the first vehicle to send the corresponding detection initial signal every other first preset time, so that other vehicles (i.e., the second vehicles) around the first vehicle may determine whether to send a detection feedback signal (referring to a corresponding introduction in S320) carrying a detection start identifier according to the detection initial signal received from the first vehicle.

In S320, the second controller selects at least one second beacon node that receive at least m detection initial signals from all the second beacon nodes as at least one second beacon node to be detected, determines a target beacon node in the at least one second beacon node to be detected according to signal parameters of detection initial signals received by each selected second beacon node to be detected, preprocesses the detection initial signals received by the target beacon node and controls the target beacon node to send the detection feedback signal, so that the second controller is in a second detection mode. Where m is a positive integer greater than or equal to 3, and the signal parameters include at least signal strengths of the detection initial signals.

The target beacon node is one of the second beacon nodes to be detected that received at least m detection initial signals from the first vehicle among all the second beacon nodes.

For the second vehicle, the second controller determines at least one second beacon node to be detected according to the detection initial signals from the first vehicle received by each second beacon node coupled to the second controller, and determines the target beacon node in the at least one second beacon node to be detected according to the signal parameters of the detection initial signals from the first vehicle received by each second beacon node to be detected.

The signal parameters may include at least signal strengths. For example, after taking the at least one second beacon node that receive at least m detection initial signals from the first vehicle among all the second beacon nodes as the at least one second beacon node to be detected, the second controller may obtain the signal strengths of the detection initial signals from the first vehicle received by the at least one second beacon node to be detected, and then obtain an average value of the signal strengths of the detection initial signals from the first vehicle received by each second beacon node to be detected, and takes a second beacon node to be detected corresponding to the maximum average value as the target beacon node. The detection feedback signal may be an IR-UWB signal having a pulse duration of 100 ps to 2 ns or a frequency of 3.1 GHz to 10.6 GHz.

For example, referring to FIGS. 5A to 5D, the first vehicle is provided with four first beacon nodes BL1, BR1, FL1 and FR1, the BL1 is provided at a rear left corner of the first vehicle, the BR1 is provided at a rear right corner of the first vehicle, the FL1 is provided at a front left corner of the first vehicle, and the FR1 is provided at a front right corner of the first vehicle. The second vehicle is provided with four second beacon nodes BL2, BR2, FL2 and FR2, the BL2 is provided at a rear left corner of the second vehicle, the BR2 is provided at a rear right corner of the second vehicle, the FL2 is provided at a front left corner of the second vehicle, and the FR2 is provided at a front right corner of the second vehicle.

Figure 5A:
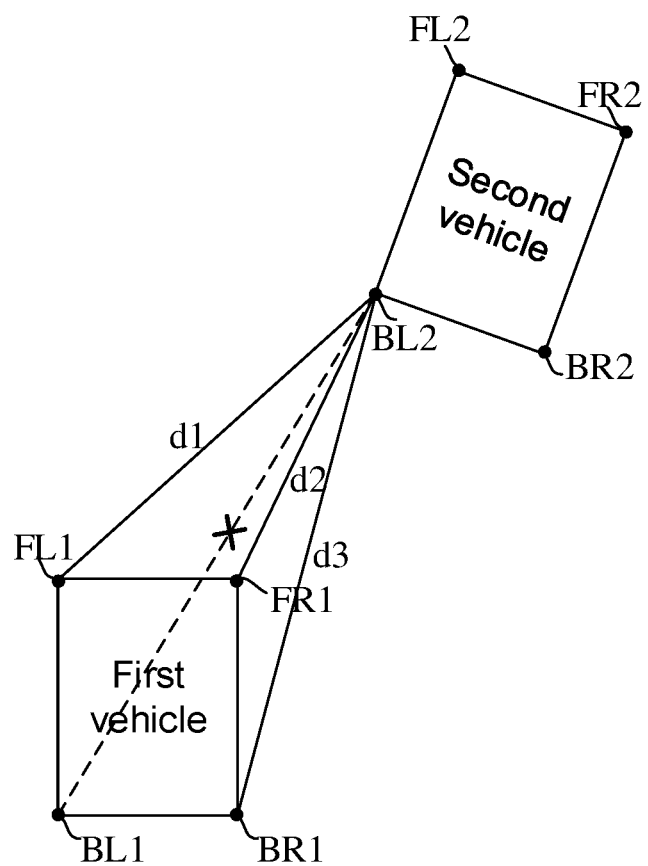
FIG. 5A is a schematic diagram of a rear left beacon node of a second vehicle receiving a detection signal from a first vehicle, in accordance with some embodiments.

Referring to FIG. 5A, the BL1, the BR1, the FL1 and the FR1 on the first vehicle each synchronously send a corresponding detection initial signal every other first preset time, and the BL2 on the second vehicle receives detection initial signals synchronously sent by the BR1, the FL1 and the FR1 (a signal between the BL1 and the BL2 is blocked by the first vehicle, and thus the BL2 cannot receive the detection initial signal sent by the BL1). That is, the BL2 receives three (at least m, m being greater than or equal to 3) detection initial signals, and thus the BL2 is a second beacon node to be detected.

Figure 5B:
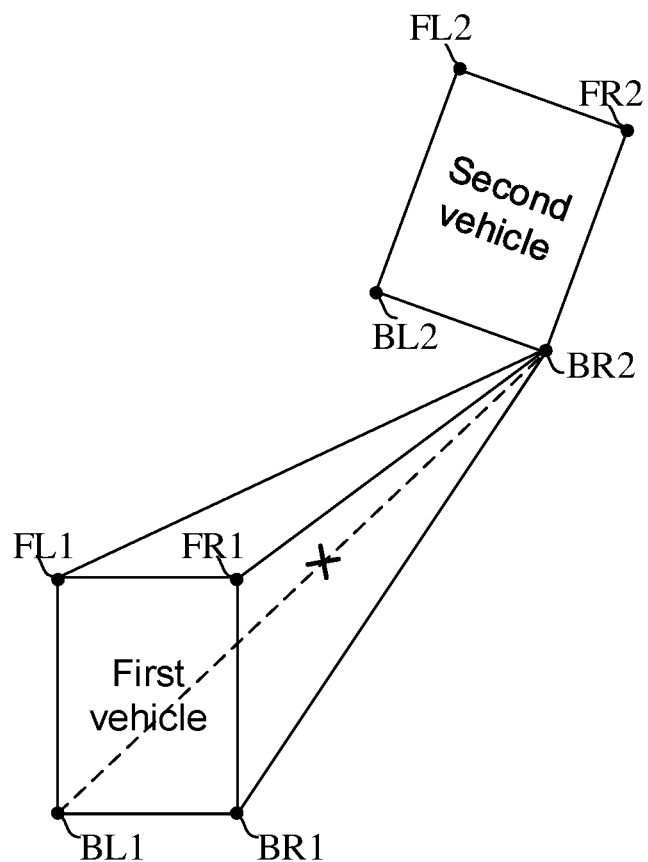
FIG. 5B is a schematic diagram of a rear right beacon node of a second vehicle receiving a detection signal from a first vehicle, in accordance with some embodiments.

Referring to FIG. 5B, the BL1, the BR1, the FL1 and the FR1 on the first vehicle each synchronously send a corresponding detection initial signal every other first preset time, and the BR2 on the second vehicle receives detection initial signals synchronously sent by the BR1, the FL1 and the FR1 (a signal between the BL1 and the BR2 is blocked by the first vehicle, and thus the BR2 cannot receive the detection initial signal sent by the BL1). That is, the BR2 receives three (at least m, m being greater than or equal to 3) detection initial signals, and thus the BR2 is a second beacon node to be detected.

Figure 5C:
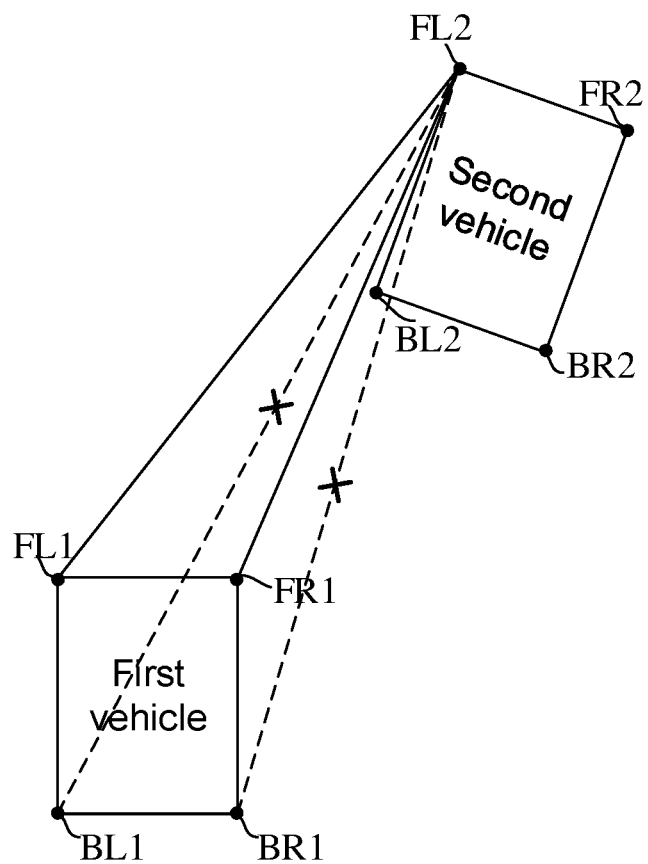
FIG. 5C is a schematic diagram of a front left beacon node of a second vehicle receiving a detection signal from a first vehicle, in accordance with some embodiments.

Referring to FIG. 5C, the BL1, the BR1, the FL1 and the FR1 on the first vehicle each synchronously send a corresponding detection initial signal every other first preset time, and the FL2 on the second vehicle receives detection initial signals synchronously sent by the FL1 and the FR1 (a signal between the BL1 and the FL2 is blocked by the first vehicle, and a signal between the BR1 and the FL2 is blocked by the second vehicle, and thus the FL2 cannot receive detection initial signals sent by the BL1 and the BR1). That is, the FL2 only receives two detection initial signals, and the number of the detection initial signals received by the FL2 is less than m, so the FL2 does not meet a condition of receiving at least m detection initial signals. Therefore, the FL2 cannot be used as a second beacon node to be detected.

Figure 5D:
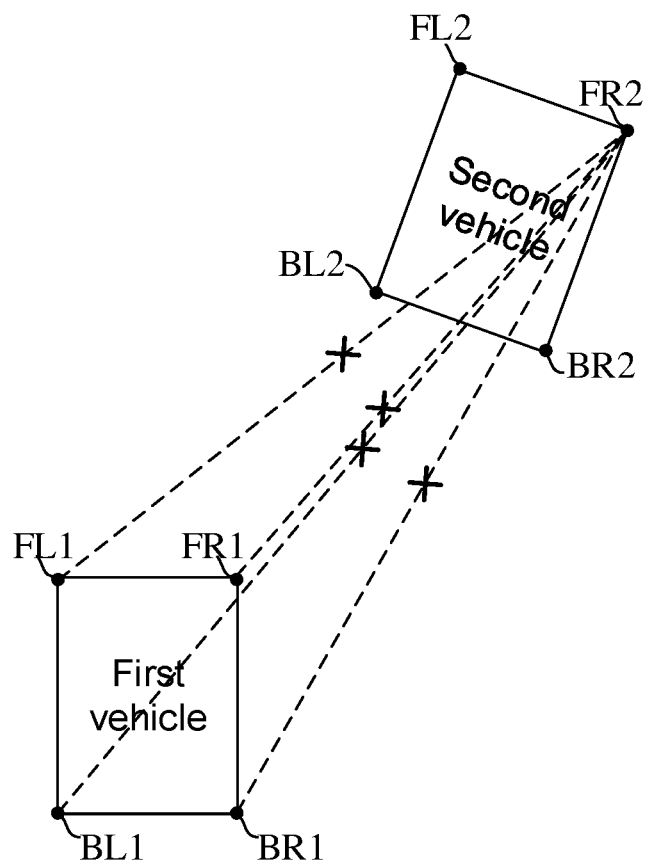
FIG. 5D is a schematic diagram of a front right beacon node of a second vehicle receiving a detection signal from a first vehicle, in accordance with some embodiments.

Referring to FIG. 5D, the BL1, the BR1, the FL1 and the FR1 on the first vehicle each synchronously send a corresponding detection initial signal every other first preset time. Signals between the FR2 on the second vehicle and all the first beacon nodes are blocked by the second vehicle. Thus, the FR2 cannot receive detection initial signals sent by the first beacon nodes, and the FR2 does not meet the condition of receiving at least m detection initial signals. Therefore, the FR2 cannot be used as a second beacon node to be detected.

Referring to FIGS. 5A and 5B, the second controller on the second vehicle selects the BL2 and the BR2 as the second beacon nodes to be detected. If the second controller determines that an average value of signal strengths of detection initial signals synchronously sent by the BR1, the FL1 and the FR1 and received by the BL2 is greater than an average value of signal strengths of detection initial signals synchronously sent by the BR1, the FL1 and the FR1 and received by the BR2, the second controller takes the BL2 as a first second beacon node to be detected, and takes the first second beacon node to be detected BL2 as the target beacon node.

After determining the target beacon node, the second controller preprocesses the detection initial signals received by the target beacon node, and controls the target beacon node to send the detection feedback signal carrying the detection start identifier (i.e., the detection feedback signal carrying the detection start identifier from the second vehicle), so that the second controller is in the second detection mode.

The second controller may preprocess the detection initial signals in various ways. For example, the second controller may obtain the first node identifier of the first beacon node carried by each of the detection initial signals, and takes the obtained first node identifiers of the first beacon nodes as the preprocessing result. Or the second controller may obtain the first node identifier of the first beacon node carried by each of the detection initial signals, sequence the first node identifiers of the first beacon nodes, and takes the sequencing result as the preprocessing result. In a case where the preprocessing result is the first node identifiers of the first beacon nodes carried by the detection initial signals, the detection start identifier includes the first node identifiers of the first beacon nodes carried by the detection initial signals. In a case where the preprocessing result is the sequencing result, the detection start identifier further includes the sequencing result, so that the first controller may determine a position of the second vehicle according to the sequencing result in subsequent steps (corresponding to S330 to S350).

A sequencing method for sequencing the first node identifiers carried by the detection initial signals received by the target beacon node may be set by those skilled in the art according to actual situations, which is not limited in the embodiments of the present disclosure. For example, the time at which the target beacon node receives the detection initial signals may be used as receiving time of the detection initial signals, and the first node identifiers of the first beacon nodes that send the detection initial signals are sequenced according to a sequence of the receiving time from first to last.

Referring to FIG. 4, the vehicle positioning method further includes S330.

In S330, the first controller determines that at least m first beacon nodes receive the detection feedback signal, so that the first controller is in a first detection mode in response to the detection feedback signal, synchronously controls each first beacon node to send its corresponding detection signal to be responded according to a preset rule, records a first moment when each first beacon node sends its corresponding detection signal to be responded, and takes each first beacon node that receive the detection feedback signal as a test first beacon node; where m is a positive integer greater than or equal to 3.

The detection start identifier may be used to trigger the first controller to be in the first detection mode, and the detection start identifier may be set by those skilled in the art according to actual situations, which is not limited in the embodiments of the present disclosure. In this step, when the first controller determines that at least m first beacon nodes on the first vehicle receive the detection feedback signal, the first controller is in the first detection mode in response to the at least m first beacon nodes receiving the detection feedback signal. Since m is greater than or equal to 3 (m it may be determined that at least three first beacon nodes on the first vehicle may receive the detection feedback signal carrying the detection start identifier from the second vehicle.

For example, as shown in FIG. 5A, for the second vehicle, after taking the first second beacon node to be detected BL2 as the target beacon node, the second controller controls the BL2 to send the detection feedback signal carrying the detection start identifier, so that the second controller is in the second detection mode. Since the signal between the BL1 and the BL2 is blocked by the body of the first vehicle, the BL1 cannot receive the detection feedback signal sent by the BL2. Therefore, when it is determined that the BR1, the FL1 and the FR1 all receive the detection feedback signal from the second vehicle (i.e., the BL2 on the second vehicle), the first controller is in the first detection mode.

With continued reference to FIG. 4, the vehicle positioning method further includes S340 to S350.

In S340, the second controller controls the target beacon node to send a detection response signal corresponding to each test first beacon node according to the preprocessing result of the detection initial signals and detection signals to be responded received by the target beacon node based on the preset rule.

In S350, the first controller records a second moment when each test first beacon node receives a detection response signal corresponding to the detection signal to be responded sent by the test first beacon node, and determines a distance between each test first beacon node and the target beacon node according to the first moment and the second moment that are corresponding to each test first beacon node, so as to determine a position of the target beacon node relative to the first vehicle.

The first controller is in the first detection mode, and the second controller is in the second detection mode. The first moment corresponding to each first beacon node is the time when the first controller controls each first beacon node to send its corresponding detection signal to be responded according to the preset rule. The second moment corresponding to each first beacon node is the time when the first beacon node receives the detection response signal corresponding to the detection signal to be responded sent by the first beacon node.

The above steps may be performed in a variety of ways, and several implementations are listed below.

In an embodiment, the detection initial signal sent by the first beacon node carries the first node identifier of the first beacon node that sends the detection initial signal. Preprocessing, by the second controller, the received detection initial signals, includes: obtaining, by the second controller, the first node identifiers carried by the detection initial signals.

The preprocessing result of the detection initial signals is the first node identifiers of the first beacon nodes. In the first detection mode, synchronously controlling, by the first controller, each first beacon node to send its corresponding detection signal to be responded according to the preset rule, includes:

synchronously controlling, by the first controller, each first beacon node to send a corresponding detection signal to be responded, the number of times that the first controller performs the synchronous control action is one in the first detection mode. The detection signal to be responded carries the first node identifier of the first beacon node that sends the detection signal to be responded, and the synchronization control action refers to the first controller controlling each first beacon node to synchronously send its corresponding detection signal to be responded.

The first controller synchronously controls each first beacon node to send its corresponding detection signal to be responded. The first moment when each first beacon node sends the detection signal to be responded corresponding to the first beacon node is the time when the first controller synchronously controls each first beacon node to send its corresponding detection signal to be responded, and the first controller takes the time as the first moment corresponding to each first beacon node.

In this embodiment, after the first controller is in the first detection mode, the first controller synchronously controls each first beacon node to send the corresponding detection signal to be responded only once. For the second vehicle, according to a time sequence of the target beacon node receiving the detection signals to be responded sent by the first beacon nodes, the second controller starts preset threads corresponding to the detected signals to be responded sequentially in response to the received detection signals to be responded sent by the first beacon nodes. That is, whenever the second controller receives a detection signal to be responded, the second controller starts a preset thread corresponding to the detection signal to be responded in response to the received detection signal to be responded.

The preset thread includes:
starting timekeeping, and obtaining the first node identifier carried by the detection signal to be responded;

then determining whether the first node identifier currently obtained exists in the first node identifiers carried by the detection initial signals.

If so, that is, when it is determined that the first node identifier currently obtained exists in the first node identifiers carried by the detection initial signals, controlling the target beacon node to send the detection response signal when the timekeeping reaches a preset duration. The detection response signal carries a node identifier of the target beacon node and the first node identifier currently obtained. Then the second controller deletes the first node identifier currently obtained.

If not, that is, when it is determined that the first node identifier currently obtained does not exist in the first node identifiers carried by the detection initial signals, the timekeeping is stopped.

The preset duration may be set by those skilled in the art according to actual situations, which is not limited in the embodiments of the present disclosure.

For the first vehicle, recording, by the first controller, the second moment when each test first beacon node receives the detection response signal corresponding to the detection signal to be responded sent by the test first beacon node, includes: for each test first beacon node, determining, the first controller, whether a first node identifier of the test first beacon node is matched with the first node identifier carried by the detection response signal received by the test first beacon node; when matching is determined, recording, by the first controller, the second moment when the test first beacon node receives the corresponding detection response signal.

Each time the target beacon node responds to the received detection signal to be responded, it will send a detection response signal corresponding to the detection signal to be responded. The detection response signal carries the node identifier of the test first beacon node that sends the detection signal to be responded, and the detection response signal is received by all test first beacon nodes. Only when the node identifier of the test first beacon node that receives the detection response signal is the same as (i.e., is matched with) the node identifier of the test first beacon node carried by the detection response signal, the first controller records the time when the test first beacon node receives the detection response signal, and takes the time as the second moment.

In a specific implementation, since the number of the detection signals to be responded received by the target beacon node may be m, m preset threads may be started corresponding to the m detection signals to be responded in the second controller, and the m preset threads may work simultaneously. In order to avoid an inaccurate positioning result in the subsequent step (corresponding to S350) due to time delay in a signal processing process, after receiving each detection signal to be responded, the embodiments of the present disclosure respond to the processing result of each detected signal to be responded when reaching the preset duration, which may effectively prevent the inaccurate positioning result in the subsequent step (corresponding to S350) due to the time delay in the signal processing process, and improve an accuracy of the positioning result.

For example, as shown in FIG. 5A, it is illustrated in this example in which the first vehicle is provided with four first beacon nodes FL1, FR1, BL1 and BR1, the second vehicle is provided with four second beacon nodes FL2, FR2, BL2 and BR2, and the second vehicle is located at a right front of the first vehicle. The first controller is in the first detection mode when determining that the BR1, the FL1 and the FR1 all receive the detection feedback signal from the second vehicle (actually the BL2 on the second vehicle).

Figure 6:
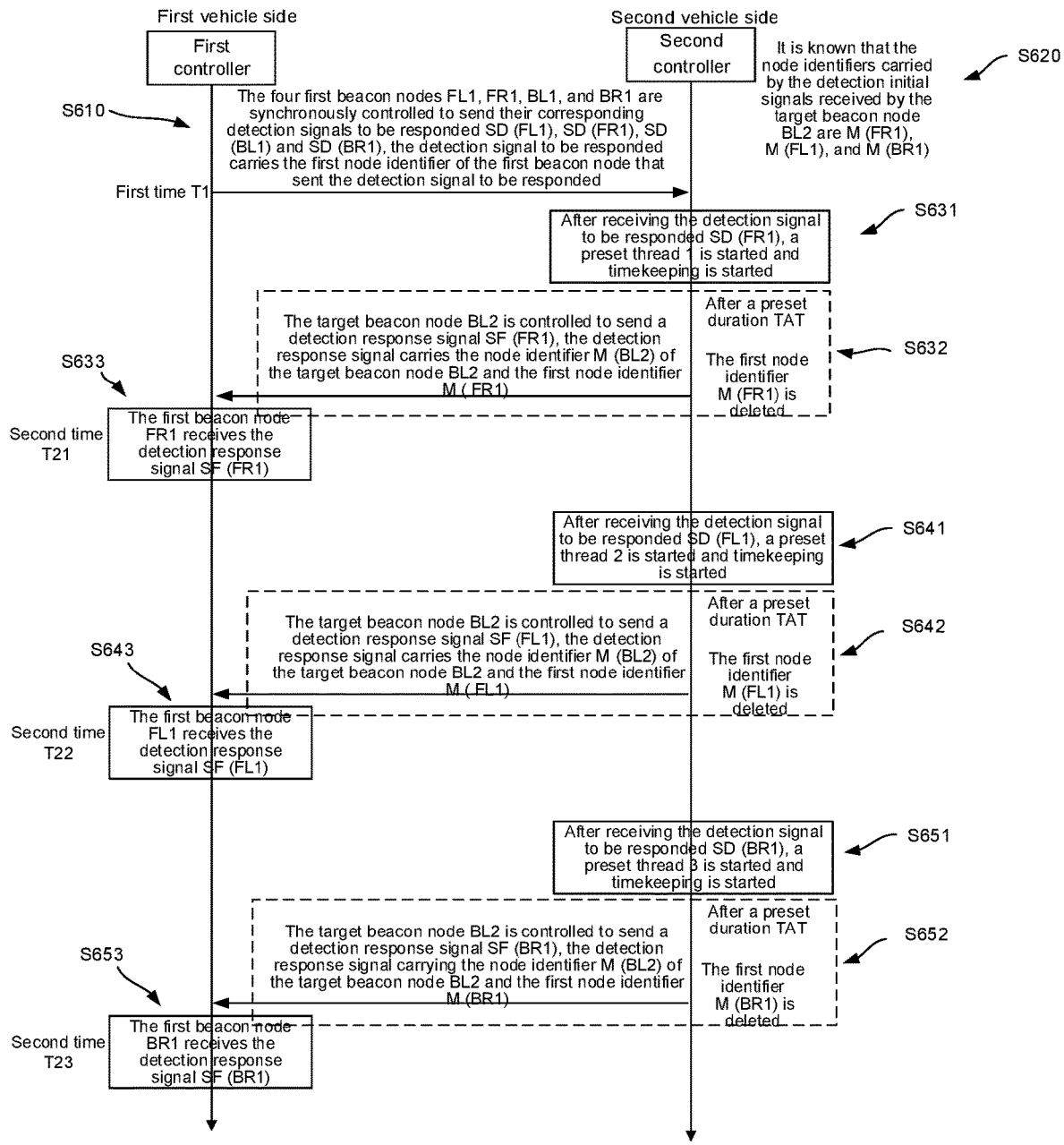
FIG. 6 is a signal flow graph of another vehicle positioning method, in accordance with some embodiments.

Referring to FIG. 6, the vehicle positioning method includes S610 to S620.

In S610, in the first detection mode, the first controller synchronously controls the four first beacon nodes the FL1, the FR1, the BL1 and the BR1 to send their corresponding detection signals to be responded SD (FL1), SD (FR1), SD (BL1) and SD (BR1), and the detection signal to be responded carries the first node identifier of the first beacon node that sends the detection signal to be responded; and the first controller obtains the time of synchronously sending the detection signal to be responded as the first moment T1 when the BL1, the BR1, the FL1 and the FR1 send the detection signals to be responded. The BR1 sends a detection signal to be responded corresponding to the BR1 (carrying a node identifier of the BR1), the FL1 sends a detection signal to be responded corresponding to the FL1 (carrying a node identifier of the FL1), the FR1 sends a detection signal to be responded corresponding to the FR1 (carrying a node identifier of the FR1), and the BL1 sends a detection signal to be responded corresponding to the BL1 (carrying a node identifier of the BL1).

In S620, according to a time sequence of the target beacon node receiving the detection signals to be responded sent by the first beacon nodes, the second controller starts preset threads corresponding to the detection signals to be responded sequentially in response to the received detection signals to be responded sent by the first beacon nodes. It is known that the node identifiers carried by the detection initial signals received by the target beacon node BL2 are M (FR1), M (FL1) and M (BR1). S620 includes S631 to S633.

In S631, after receiving the detection signal to be responded SD (FR1), a preset thread 1 is started and timekeeping is started.

In S632, after the timekeeping reaches a preset duration TAT, the target beacon node BL2 is controlled to send a detection response signal SF (FR1), the detection response signal carries the node identifier M (BL2) of the target beacon node BL2 and the first node identifier M (FR1), and the first node identifier M (FR1) is deleted.

If it is determined that the first node identifier of the FR1 does not exist in the first node identifiers carried by the detection initial signals, timekeeping is stopped.

In S633, for the first vehicle, the first beacon node FR1 receives the detection response signal SF (FR1), i.e., the detection response signal corresponding to the detection signal to be responded sent by the FR1; and the time when the FR1 receives the detection response signal SF (FR1) is taken as a second moment T21 when the FR1 receives the detection response signal corresponding to the detection signal to be responded sent by the FR1.

Similarly, with continued reference to FIG. 6, S620 further includes S641 to S643 and S651 to S653.

In S641, after the target beacon node BL2 receives the detection signal to be responded SD (FL1), a preset thread 2 is started and timekeeping is started.

In S642, after the timekeeping reaches the preset duration TAT, the target beacon node BL2 is controlled to send a detection response signal SF (FL1), the detection response signal carries the node identifier M (BL2) of the target beacon node BL2 and the first node identifier M (FL1), and the first node identifier M (FL1) is deleted.

In S643, for the first vehicle, the first beacon node FL1 receives the detection response signal SF (FL1), i.e., the detection response signal corresponding to the detection signal to be responded sent by the first beacon section FL1; and the time when the FL1 receives the detection response signal SF (FL1) is taken as a second moment T22 when the FL1 receives the detection response signal corresponding to the detection signal to be responded sent by the FL1.

In S651, after the target beacon node BL2 receives the detection signal to be responded SD (BR1), a preset thread 3 is started and timekeeping is started.

In S652, after the timekeeping reaches the preset duration TAT, the target beacon node BL2 is controlled to send a detection response signal SF (BR1), the detection response signal carries the node identifier M (BL2) of the target beacon node BL2 and the first node identifier M (BR1), and the first node identifier M (BR1) is deleted.

In S653, for the first vehicle, the first beacon node BR1 receives the detection response signal SF (BR1), i.e., the detection response signal corresponding to the detection signal to be responded sent by the first beacon node BR1; and the time when the BR1 receives the detection response signal SF (BR1) is taken as a second moment T23 when the BR1 receives the detection response signal corresponding to the detection signal to be responded sent by the BR1.

In another embodiment, the preprocessing result of the detection initial signals is the sequencing result, and the detection feedback signal that the second controller controls the target beacon node to send carries the sequencing result.

In this embodiment, the sequencing result is a result of sequencing the first node identifiers of the first beacon nodes. In the first detection mode, synchronously controlling, by the first controller, each first beacon node to send the corresponding detection signal to be responded according to the preset rule, includes: synchronously controlling, by the first controller, each first beacon node to send the corresponding detection signal to be responded according to the preset rule, the number of times that the first controller performs the synchronization control action being at least m in the first detection mode. The detection signal to be responded carries the first node identifier of the first beacon node that sends the detection signal to be responded.

Based on the preset rule, the second controller controls the target beacon node to send the detection response signal corresponding to each test first beacon node according to the preprocessing result of the detection initial signals and the detection signals to be responded received by the target beacon node, which may be as follows.

For the first vehicle, after the first controller responds to be in the first detection mode and performs the synchronous control action for a K-th time, the second controller obtains the first node identifiers carried by the detection signals to be responded received by the target beacon node. Performing the synchronous control action refers to that the first controller synchronously controls each first beacon node to send its corresponding detection signal to be responded. The synchronization control action that the first controller performs for the K-th time triggers a positioning response operation between the second vehicle and the first vehicle, which is as follows.

For the second vehicle, after the second controller responds to be in the second detection mode, the second controller obtains the first node identifiers carried by the detection signals to be responded received by the target beacon node.

The second controller starts timekeeping when determining that the first node identifier currently obtained is sequenced at a k-th position in the sequencing result.

The second controller controls the target beacon node to send the detection response signal when the timekeeping reaches the preset duration, the detection response signal carries the node identifier of the target beacon node, where k takes a value in a positive integer set of [1, m] in sequence.

The second controller controls the target beacon node to send the detection response signal corresponding to the detection signal to be responded, so that the first vehicle can respond to the detection response signal sent by the target beacon node. For the first vehicle, when the first control determines that the test first beacon node corresponding to the first node identifier sequenced at the k-th position in the sequencing result receives the detection response signal corresponding to the test first beacon node (e.g., when the first controller determines that the node identifier of the test first beacon node sequenced at the k-th position in the sequencing result receives the detection feedback signal from the second vehicle for the k-th time after being in the first detection mode), the first controller performs the synchronization control action again, so that the second vehicle responds to a corresponding detection signal to be responded sent by each first test beacon node, where k takes a value in the positive integer set of [1, m] in sequence.

Recording, by the first controller, the second moment when each test first beacon node receives the detection response signal corresponding to the detection signal to be responded sent by the test first beacon node, may include:

obtaining, by the first controller, the sequencing result carried by the detection feedback signal;

after the first controller performs the synchronization control action for the k-th time in the first detection mode, recording, by the first controller, the second moment when the test first beacon node to which the first node identifier sequenced at the k-th position in the sequencing result belongs receives the detection response signal.

When the first controller performs the synchronization control action for the k-th time, the first controller obtains the time of synchronously sending the detection signal to be responded, and takes the time as the first moment when the test first beacon node sequenced at the k-th position in the sequencing result sends the detection signal to be responded corresponding to the first test beacon node. The first controller determines that the test first beacon node to which the first node identifier sequenced at the k-th position in the sequencing result belongs receives the detection response signal corresponding to the test first beacon node, and takes the time when the test first beacon node receives the detection response signal as a second moment when the first beacon node receives the corresponding detection response signal.

For example, if the sequencing result is M (FR1)-M (FL1)-M (BR1), referring to FIG. 5A, it is illustrated in this example in which the first vehicle is provided with four first beacon nodes FL1, FR1, BL1 and BR1, the second vehicle is provided with four second beacon nodes FL2, FR2, BL2 and BR2, and the second vehicle is located at the right front of the first vehicle. When the first controller determines that the BR1, the FL1 and the FR1 all have received the detection feedback signal from the second vehicle (actually the BL2 on the second vehicle), the first controller is in the first detection mode.

Figure 7:
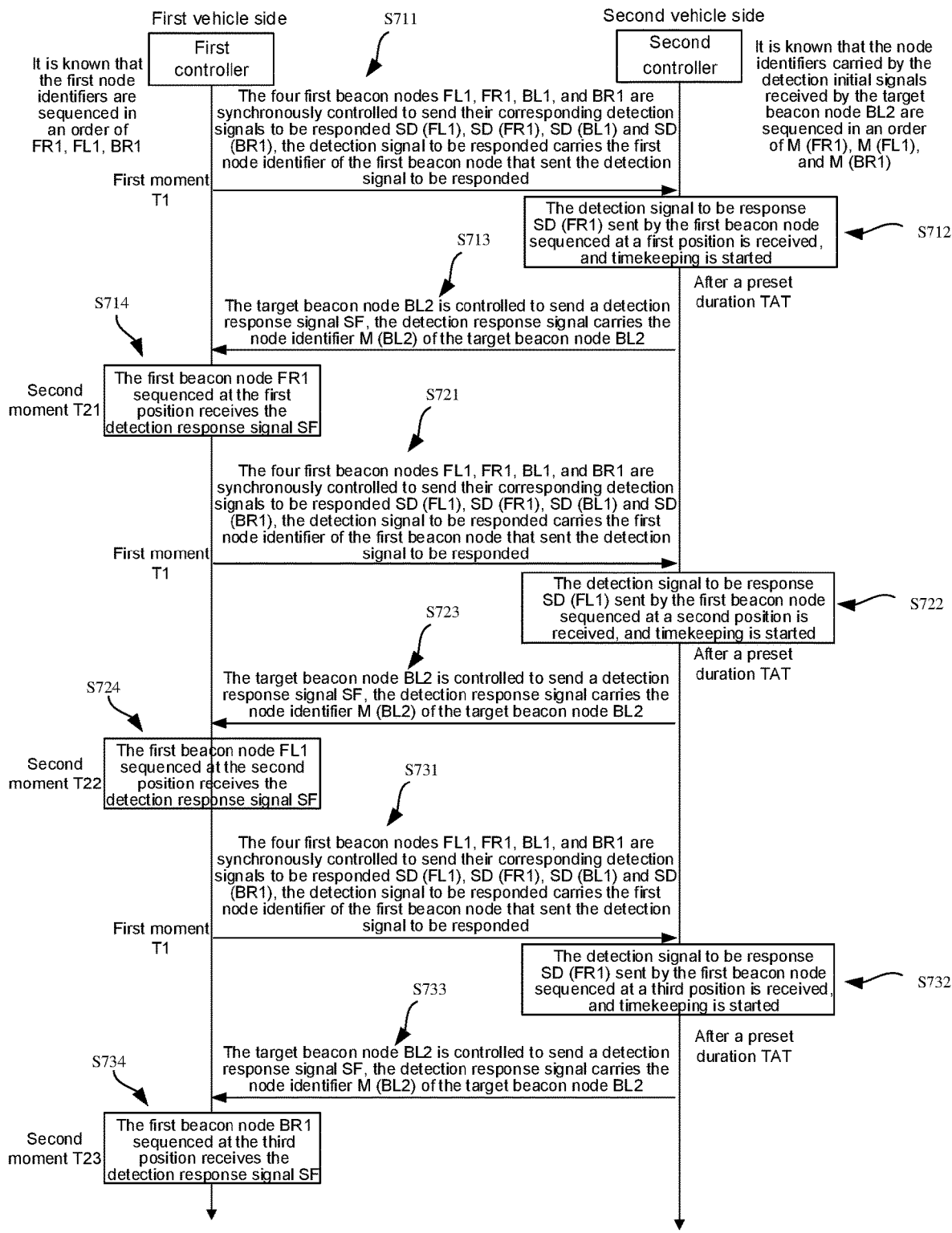
FIG. 7 is a signal flow graph of yet another vehicle positioning method, in accordance with some embodiments.

Referring to FIG. 7, the vehicle positioning method includes S711 to S714, S721 to S724, and S731 to S734.

In S711, the first controller responds to be in the first detection mode, and synchronously controls the four first beacon nodes FL1, FR1, BL1 and BR1 to send their corresponding detection signals to be responded SD (FL1) and SD (FR1), SD (BL1) and SD (BR1), the detection signal to be responded carries the first node identifier of the first beacon node that sends the detection signal to be responded; and the first controller obtains the time of synchronously sending the detection signals to be responded as the first moment T1 when the BL1, the BR1, the FL1 and the FR1 send the detection signals to be responded. The BR1 sends a detection signal to be responded corresponding to the BR1 (carrying a node identifier of the BR1), the FL1 sends a detection signal to be responded corresponding to the FL1 (carrying a node identifier of the FL1), the FR1 sends a detection signal to be responded corresponding to the FR1 (carrying a node identifier of the FR1), and the BL1 sends a detection signal to be responded corresponding to the BL1 (carrying a node identifier of the BL1).

For the second vehicle, it is known for the second controller that the first node identifiers carried by the detection initial signals received by the target beacon node BL2 are sequenced in an order of M (FR1), M (FL1) and M (BR1).

In S712, upon the second controller is in the second detection mode, the target beacon node BL2 receives a detection signal to be responded SD (FR1) sent by the first beacon node FR1 sequenced at a first position, and starts timekeeping.

In S713, when the timekeeping reaches the preset duration TAT, the target beacon node BL2 is controlled to send a detection response signal SF, and the detection response signal SF carries the node identifier M (BL2) of the target beacon node BL2 and the first node identifier M (FR1).

Since the first node identifier corresponding to the FR1 in the sequencing result is sequenced at the first position, the second controller only responds to the BL2 to receive a detection signal to be responded SD (FR1) carrying the first node identifier of the FR1 sequenced at the first position, and controls the target beacon node BL2 to send a detection response signal SF corresponding to the detection signal to be responded SD (FR1) of the FR1 sequenced at the first position.

It will be noted that when the target beacon node BL2 receives the detection signals to be responded SD sent by other first beacon nodes (i.e., FL1 and BR1), the second controller does not respond, that is, the second controller does not send a detection response signal.

In S714, for the first vehicle, the first beacon node FR1 sequenced at the first position receives the detection response signal SF; and the time when the first beacon node FR1 receives the detection response signal SF is recorded and taken as a second moment T21 when the FR1 receives the detection response signal SF corresponding to the detection signal to be responded SD (FR1) sent by the FR1.

Correspondingly, for the first vehicle, the first controller only responds to the detection response signal SF received for the first time by the FR1 sequenced at the first position in the sequencing result according to the sequencing result, and obtains the time when the detection response signal SF is received by the FR1 sequenced at the first position in the sequencing result, and takes the time as the second moment T21 when FR1 receives the detection response signal corresponding to the detection signal to be responded sent by the FR1.

In S721, the first controller synchronously controls the four first beacon nodes FL1, FR1, BL1 and BR1 for a second time to send their corresponding detection signals to be responded SD (FL1), SD (FR1), SD (BL1) and SD (BR1), the detection signal to be responded carries the first node identifier of the first beacon node that sends the detection signal to be responded; and the first controller obtains the time of synchronously sending the detection signals to be responded and takes the time as the first moment T1 when the BL1, the BR1, the FL1 and the FR1 send the detection signals to be responded. The BR1 sends a detection signal to be responded corresponding to the BR1 (carrying a node identifier of the BR1), the FL1 sends a detection signal to be responded corresponding to the FL1 (carrying a node identifier of the FL1), the FR1 sends a detection signal to be responded corresponding to the FR1 (carrying a node identifier of the FR1), and the BL1 sends a detection signal to be responded corresponding to the BL1 (carrying a node identifier of the BL1).

In S722, the target beacon node BL2 receives a detection signal to be responded SD (FL1) sent by the first beacon node FL1 sequenced at a second position, and starts timekeeping.

In S723, when the timekeeping reaches the preset duration TAT, the second controller controls the target beacon node BL2 to send a detection response signal SF, the detection response signal SF carries the node identifier M (BL2) of the target beacon node BL2 and the first node identifier M (FL1).

It will be noted that when the target beacon node BL2 receives the detection signal to be responded SD sent by other first beacon nodes (i.e., FR1 and BR1), the second controller does not respond, that is, the second controller does not send a detection response signal.

In S724, for the first vehicle, the first beacon node FL1 sequenced at the second position receives the detection response signal SF; and the time when the first beacon node FL1 receives the detection response signal SF is recorded and taken as a second moment T22 when the FL1 receives the detection response signal SF corresponding to the detection signal to be responded SD (FL1) sent by the FL1.

In S731, the first controller synchronously controls the four first beacon nodes FL1, FR1, BL1 and BR1 for a third time to send their corresponding detection signals to be responded SD (FL1), SD (FR1), SD (BL1) and SD (BR1), the detection signal to be responded carries the first node identifier of the first beacon node that sends the detection signal to be responded; and the first controller obtains the time of synchronously sending the detection signals to be responded and takes the time as the first moment T1 when the BL1, the BR1, the FL1 and the FR1 send the detection signals to be responded. The BR1 sends a detection signal to be responded corresponding to the BR1 (carrying a node identifier of the BR1), the FL1 sends a detection signal to be responded corresponding to the FL1 (carrying a node identifier of the FL1), the FR1 sends a detection signal to be responded corresponding to the FR1 (carrying a node identifier of the FR1), and the BL1 sends a detection signal to be responded corresponding to the BL1 (carrying a node identifier of the BL1).

In S732, upon the second controller is in the second detection mode, the target beacon node BL2 receives a detection signal to be responded SD (BR1) sent by the first beacon node BR1 sequenced at a third position, and starts timekeeping.

In S733, when the timekeeping reaches the preset duration TAT, the target beacon node BL2 is controlled to send a detection response signal SF, the detection response signal SF carries the node identifier M (BL2) of the target beacon node BL2 and the first node identifier M (BR1).

It will be noted that when the target beacon node BL2 receives the detection signals to be responded SD sent by other first beacon nodes (i.e., FR1 and FL1), the second controller does not respond, that is, the second controller does not send a detection response signal.

In S734, for the first vehicle, the first beacon node BR1 sequenced at the third position receives the detection response signal SF; and the time when the first beacon node BR1 receives the detection response signal SF is recorded and taken as a second moment T23 when the BR1 receives the detection response signal SF corresponding to the detection signal to be responded SD (BR1) sent by the BR1.

Of course, it will be understood that execution manners of the steps listed above are only exemplary, and in a specific implementation, the execution manners include, but are not limited to, the manners listed above.

In S350, the first controller determines the distance between each test first beacon node and the target beacon node according to the first moment and the second moment corresponding to each test first beacon node, so as to determine the position of the target beacon node relative to the first vehicle, which includes:

when the distance between each test first beacon node and the target beacon node is determined according to the first moment and the second moment corresponding to each test first beacon node, determining the distance between each test first beacon node and the target beacon node through the following formula:

$$d = \frac{(T4 - T1 - T0) \times c}{2};$$

where d is the distance between the first beacon node and the target beacon node, T4 is the second moment, T1 is the first moment, T0 is the preset duration, and c is a speed of light (in a specific implementation, c may be 3.0×10$^8$ m/s).

The number of the test first beacon nodes is m, and m is greater than or equal to 3. A specific position of the target beacon node relative to the first vehicle may be obtained according to the distance between each test first beacon node and the target beacon node.

First, positions of m test first beacon nodes on the first vehicle are determined according to pre-associated position information of the m test first beacon nodes. For any first beacon node among the m test first beacon nodes, taking a position of the test first beacon node on the first vehicle as a center of a circle and taking a distance between the test first beacon node and the target beacon node as a radius, a circle is drawn to obtain a positioning circle corresponding to the test first beacon node, and the target beacon node is located on the positioning circle. A common intersection point of a plurality of positioning circles corresponding to the m test first beacon nodes is taken as a position of the second vehicle. Due to an actual measurement error, the positioning circles corresponding to the m test first beacon nodes may not intersect at one point together, but there is a corresponding intersecting region where the positioning circles intersect together, then a position of a target intersection region with the smallest area in the intersection regions where the positioning circles corresponding to the m test first beacon nodes intersect together may be taken as the position of the second vehicle.

Figure 8:
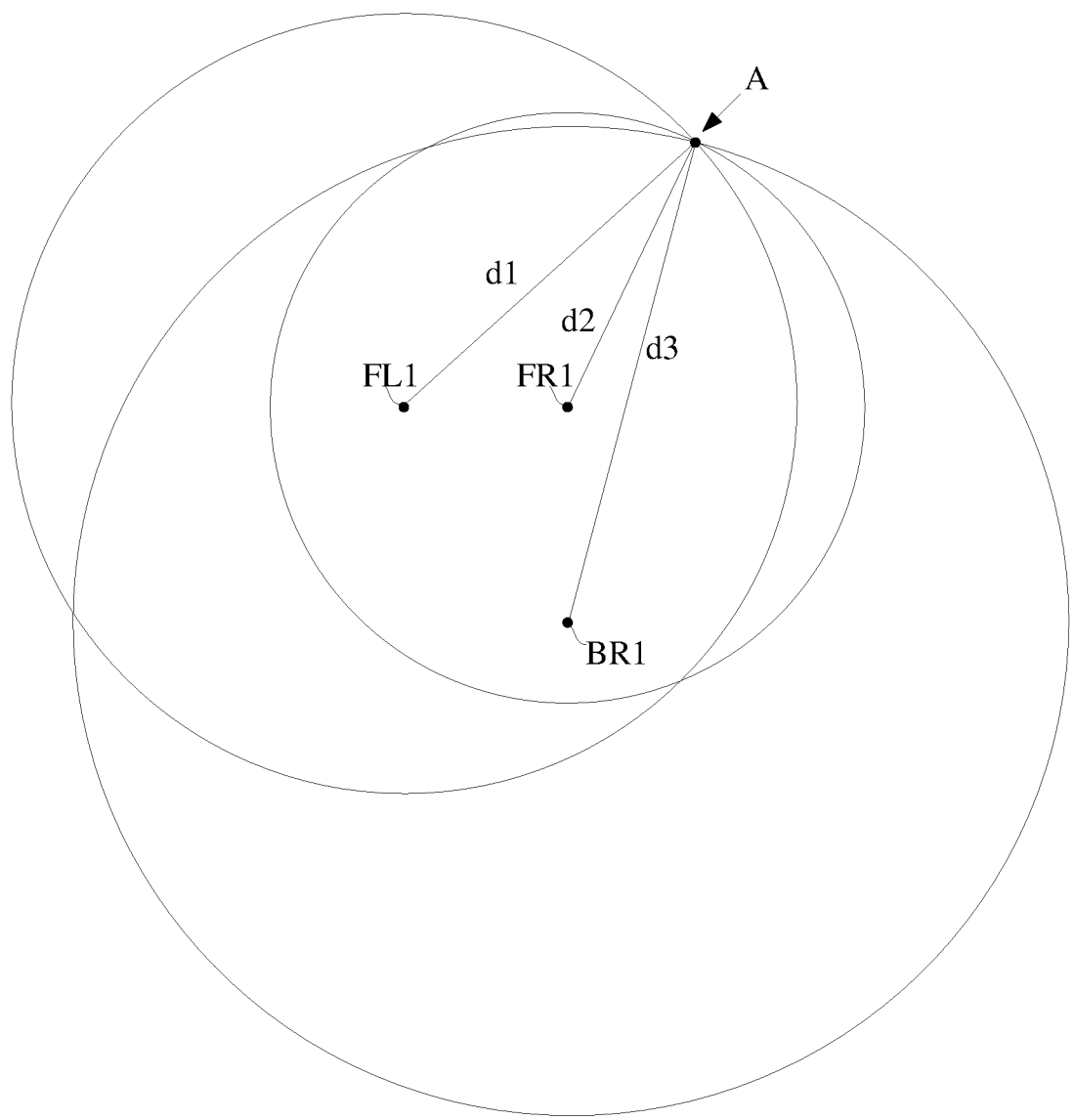
FIG. 8 is a schematic diagram of positioning a left rear beacon node of a second vehicle, in accordance with some embodiments.

For example, as shown in FIG. 8, if a distance between FL1 on the first vehicle and BR2 in FIG. 5A is d1, a distance between FR1 on the first vehicle and BR2 is d2 and a distance between BR1 on the first vehicle and BR2 is d3, a positioning circle is drawn with a position of FL1 as a center of a circle and d1 as a radius, a positioning circle is drawn with a position of FR1 as a center of a circle and d2 as a radius, and a positioning circle is drawn with a position of BR1 as a center of a circle and d3 as a radius, so as to obtain an intersection point (or intersection region) A of the three positioning circles, and take a position of the intersection point (or intersection region) A as the position of the second vehicle.

In some embodiments, after obtaining the relative position of one target beacon node relative to the first vehicle, the vehicle positioning method further includes the following.

The second controller takes each remaining second beacon node to be detected on the second vehicle as a target beacon node. For example, referring to FIG. 5B, the second beacon nodes to be detected on the second vehicle further include BR2.

The first controller determines a position of each remaining second beacon node to be detected relative to the first vehicle according to each target beacon node determined by the second controller. Relative positions of the remaining target beacon nodes relative to the first vehicle may be obtained in a manner similar to the manner for obtaining the position of the first target beacon node relative to the first vehicle, which will not be repeated here.

The first controller obtains position information of the second vehicle relative to the first vehicle according to the position of each second beacon node to be detected relative to the first vehicle. According to relative positions of at least two second beacon nodes to be detected relative to the first vehicle and relative positions of the second beacon nodes stored in the second controller in advance, the first controller is capable of obtaining the relative position of each second beacon node to be detected of the second vehicle relative to the first vehicle, and further obtaining a contour of the second vehicle and a position of the second vehicle as a whole relative to the first vehicle.

It can be seen that position information of other vehicles may be obtained through the vehicle positioning apparatus installed on the vehicle in the embodiments of the present disclosure. The controller in the vehicle positioning apparatus controls beacon nodes to send and receive non-directional signals, which is not only suitable for monitoring a relative position between two vehicles in a stationary state, but also suitable for monitoring a relative position between two vehicles in a moving state, and also suitable for automatic driving scenarios. In addition, in the embodiments of the present disclosure, there is no need to take image information during a monitoring process, which is not affected by factors such as light, and ensures an accuracy of a monitoring result. When the detection signal to be responded and the detection response signal are IR-UWB signals, centimeter-level accuracy may be achieved. When the signal pulse duration sent by the beacon node is 100 ps to 2 ns, an upper limit of error is 30 cm, and thus centimeter-level positioning accuracy may be achieved.

Moreover, in the embodiments of the present disclosure, distances between at least m first beacon nodes and the target beacon node may be determined according to the first moment when the first beacon node sends the detection signal to be responded and the second moment when the detection response signal is received. An algorithm for determining a relative position of the second vehicle relative to the first vehicle according to the distances is simple and efficient. Moreover, the embodiments of the present disclosure may be implemented in hardware through at least four beacon nodes and one processor, an equipment cost is low, and it is suitable for industrial mass production and use.

In some embodiments, the first controller is in the invitation mode after obtaining the position information of the second vehicle relative to the first vehicle, so that the first vehicle may continue to detect relative positions of other surrounding vehicles relative to the first vehicle, thereby detecting a surrounding driving environment in real time.

After the first controller synchronously controls each first beacon node to send a corresponding detection initial signal, the method further includes the following.

The second controller determines whether second beacon nodes that receive less than m detection initial signals exist among all the second beacon nodes.

If so, the second controller selects two second beacon nodes that receive two detection initial signals from all the second beacon nodes as second beacon nodes to be detected, and controls the two second beacon nodes to be detected to send detection feedback signals.

Figure 9A:
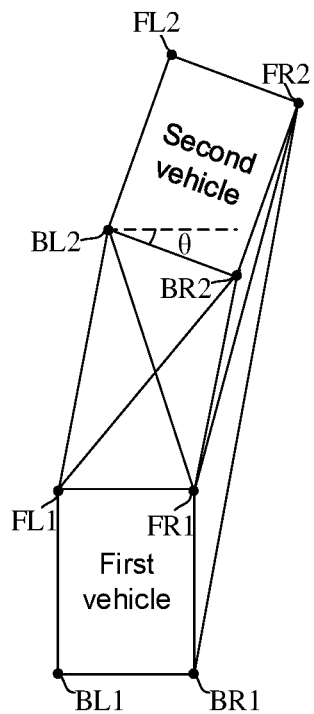
FIG. 9A is a schematic diagram of a relative position relationship between a second vehicle and a first vehicle, in accordance with some embodiments.
Figure 10A:
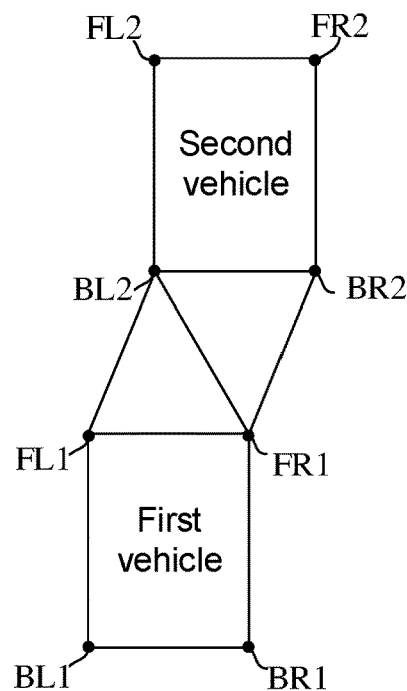
FIG. 10A is a schematic diagram of another relative position relationship between a second vehicle and a first vehicle, in accordance with some embodiments.

Referring to FIGS. 9A and 10A, when the second vehicle is located directly in front of the first vehicle, not all second beacon nodes may receive at least m detection initial signals. For example, some second beacon nodes can only receive detection initial signals sent by two first beacon nodes. In this case, two second beacon nodes that can receive two detection initial signals are selected from all the second beacon nodes as second beacon nodes to be detected.

For example, referring to FIGS. 9A and 10A, BL2, BR2 and FR2 on the second vehicle can receive two detection initial signals, and the BL2 and the BR2 may be selected as second beacon nodes to be detected.

The first controller takes two first beacon nodes that receive detection feedback signals sent by the two second beacon nodes to be detected as test first beacon nodes, and detects a distance value between each test first beacon node and each second beacon node to be detected. Referring to FIGS. 9A and 10A, the two first beacon nodes FL1 and FR1 on the first vehicle may be selected as the test first beacon nodes.

A method for detecting the distance value between the test first beacon node and the second beacon node to be detected is the same as the above method for detecting the distance between the test first beacon node and the target node, which will not be repeated here.

The first controller may calculate a deflection angle of the second vehicle relative to the first beacon node according to the detected distance values, a distance value between two test first beacon nodes, and a distance value between the two second beacon nodes to be detected.

Figure 9B:
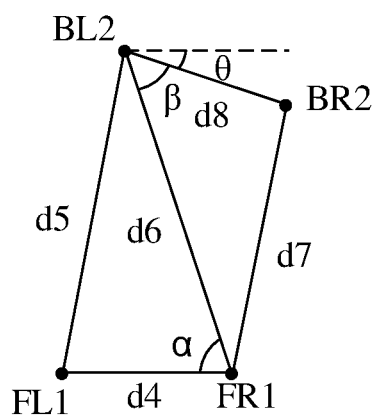
FIG. 9B is a schematic diagram of a relative deflection angle of the second vehicle to the first vehicle in FIG. 9A.

For example, as shown in FIG. 9B, a distance d4 between FL1 and FR1, a distance d5 between FL1 and BL2 on the second vehicle, a distance d6 between FR1 and BL2 on the second vehicle, a distance d7 between FR1 and BR2 on the second vehicle, and a distance d8 between BL2 and BR2 are obtained, and the deflection angle of the second vehicle relative to the first vehicle is calculated through the following formula:

$$\alpha = \cos^{-1}\frac{d4 \times d4 + d6 \times d6 - d5 \times d5}{2 \times d4 \times d6};$$

$$\beta = \cos^{-1}\frac{d8 \times d8 + d6 \times d6 - d7 \times d7}{2 \times d8 \times d6};$$

$$\theta = \alpha - \beta =$$

$$\cos^{-1}\frac{d4 \times d4 + d6 \times d6 - d5 \times d5}{2 \times d4 \times d6} - \cos^{-1}\frac{d8 \times d8 + d6 \times d6 - d7 \times d7}{2 \times d8 \times d6}.$$

Figure 10B:
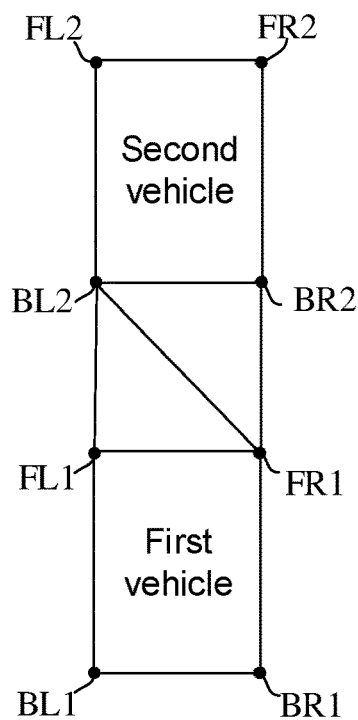
FIG. 10B is a schematic diagram of yet another relative position relationship between a second vehicle and a first vehicle, in accordance with some embodiments.

With a moving direction of the first vehicle as a reference, the deflection angle of the second vehicle relative to the first vehicle may be determined according to an included angle θ between the second vehicle and the first vehicle. In a case wherein θ is zero, referring to FIGS. 10A and 10B, it may be determined that the first vehicle and the second vehicle are not deflected relative to each other.

In some embodiments, a movement direction of the second vehicle relative to the first vehicle may be obtained, which includes:

upon the first controller is in the first detection mode in response to the detection feedback signal, obtaining, by the first controller, distance values between each first beacon node and the second vehicle at the third moment and the fourth moment; and determining the movement direction of the second vehicle relative to the first vehicle according to the distance value between each first beacon node and the second vehicle at the third moment, and the distance value between each first beacon node and the second vehicle at the fourth moment. The time difference between the third moment and the fourth moment is less than or equal to a first time threshold. According to distance values between each first beacon node and the second vehicle between the third moment and the fourth moment, the distance changes of the second vehicle relative to each first beacon node between the third moment and the fourth moment are determined, and the movement direction of the second vehicle relative to the first vehicle between the third moment and the fourth moment are further determined.

In a implementation, since the smaller a first time difference between a third moment and a fourth moment is, the closer the first vehicle and the second vehicle are to a relatively stationary state, and the higher an accuracy of a determination result of the deflection angle of the second vehicle relative to the first vehicle is. Therefore, in order to improve the accuracy of determining the deflection angle of the second vehicle relative to the first vehicle (i.e., an accuracy of θ), it is necessary to minimize the first time difference between the third moment and the fourth moment as much as possible.

In order to achieve the purpose of minimizing the first time difference between the third moment and the fourth moment, after the second controller determines at least one second beacon node to be detected (e.g., at least two second beacon nodes to be detected) according to the detection initial signals from the first vehicle received by each second beacon node coupled to the second controller, the second controller may further select two second beacon nodes to be detected from the at least two second beacon nodes to be detected according to signal parameters of the detection initial signals from the first vehicle, and a selection manner of the second beacon node to be detected may be set by those skilled in the art according to actual situations.

For example, after taking second beacon nodes that have received two detection initial signals among all the second beacon nodes as the second beacon nodes to be detected, the second controller may obtain signal strengths of detection initial signals received by each second beacon node to be detected in the at least one second beacon node to be detected, and then obtain an average value of the signal strengths of the detection initial signals received by each second beacon node to be detected. Average values of the signal strengths of the detection initial signals received by the second beacon nodes to be detected are sequenced in a descending order, and a second beacon node to be detected corresponding to the average value sequenced at a first position is taken as a first second beacon node to be detected (that is, the second beacon node to be detected corresponding to the maximum average value in S320 is taken as the first second beacon node to be detected), and a second beacon node to be detected corresponding to the average value sequenced at a second position is taken as a second second beacon node to be detected. After sending the detection feedback signal corresponding to the target beacon node for the m-th time and before being in the invitation mode, the second controller may further determine whether a second beacon node to be detected exists or not, if the determination result is not, the second controller is in the invitation mode, and if the determination result is yes, the second controller sequentially takes the first second beacon node to be detected and the second second beacon node to be detected as the target beacon node, and re-controls the target beacon node to send the detection feedback signal carrying a detection start identifier.

The first controller may obtain the position information of the second vehicle relative to the first vehicle according to the detected distance value and the calculated deflection angle.

Figure 11:
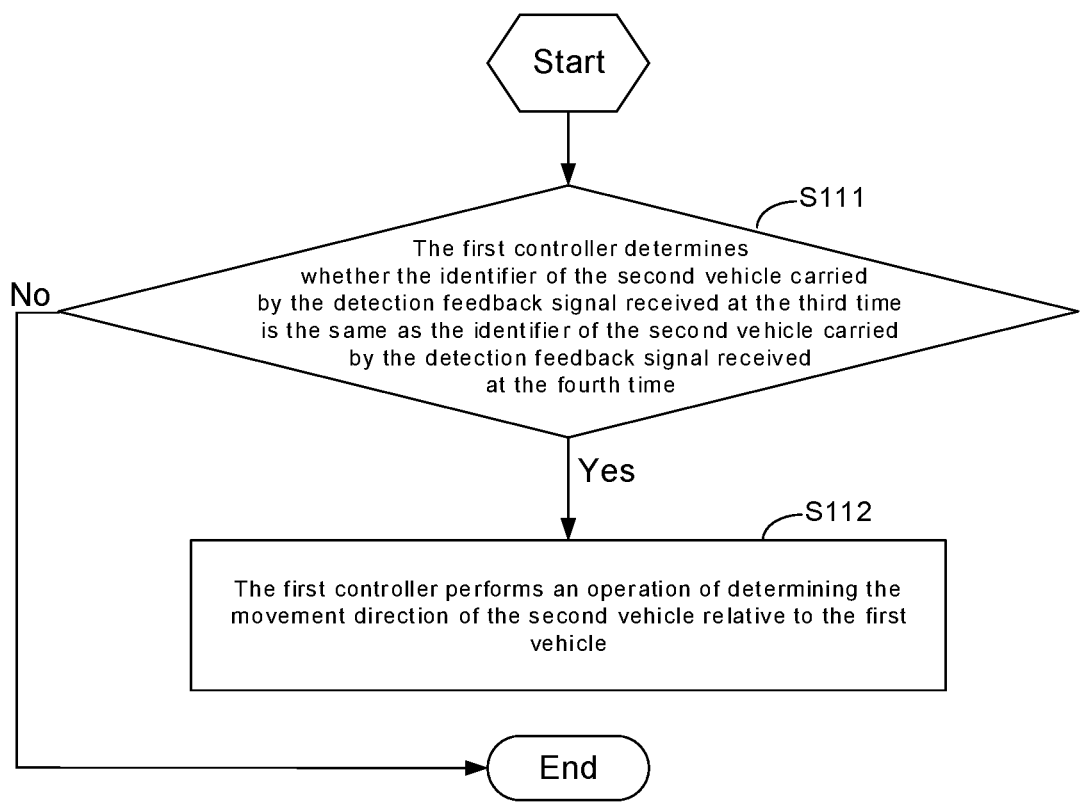
FIG. 11 is a flow chart of a vehicle positioning method, in accordance with some embodiments.

The detection feedback signal sent by the target beacon node carries an identifier of the second vehicle, and before the first controller obtains the distance value between each first beacon node and the second vehicle at the fourth moment, referring to FIG. 11, in some embodiments, the following steps may also be performed.

In S111, the first controller determines whether the identifier of the second vehicle carried by the detection feedback signal received at the third moment is the same as the identifier of the second vehicle carried by the detection feedback signal received at the fourth moment. If so, S112 is performed; and if not, this process is ended.

In S112, the first controller performs an operation of determining the movement direction of the second vehicle relative to the first vehicle. That is, the first controller determines the movement direction of the second vehicle relative to the first vehicle according to the distance value between each first beacon node and the second vehicle at the third moment and the distance value between each first beacon node and the second vehicle at the fourth moment.

There may be many vehicles around a vehicle during a running process, and the first vehicle may simultaneously detect distances between itself (the first vehicle) and all surrounding vehicles (the second vehicles). Therefore, only when the first controller determines that the identifiers of the second vehicle carried by the detection feedback signals received at the third moment and the fourth moment are the same (i.e., when the detection feedback signals received at the two moments belong to the same second vehicle), the first controller determines the movement direction of the second vehicle relative to the first vehicle.

The time difference between the third moment and the fourth moment is the first time difference, and the first time difference is less than the first time threshold. The first time threshold may be set by those skilled in the art according to actual situations, which is not limited in the embodiments of the present disclosure.

Figure 12:
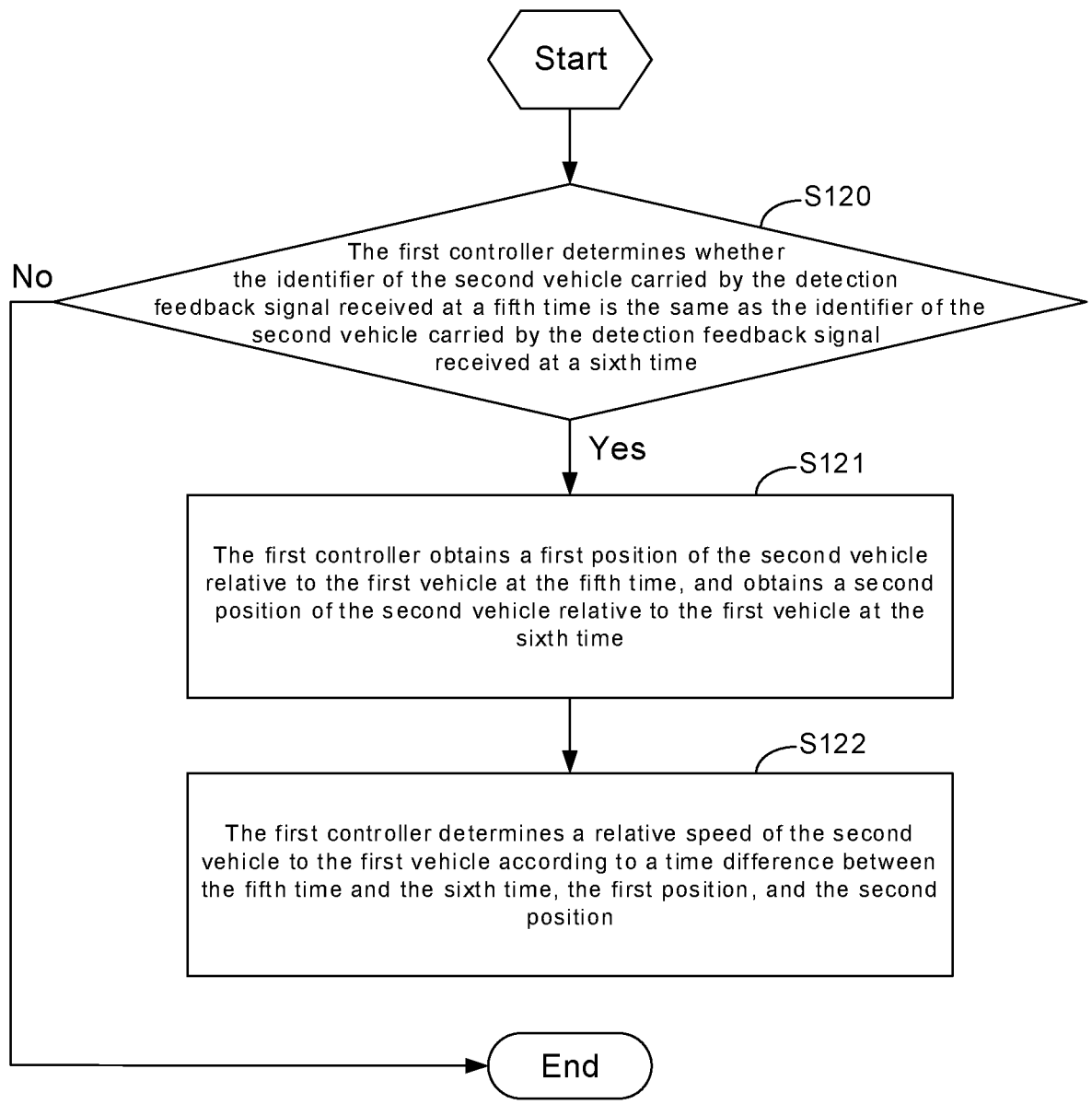
FIG. 12 is a flow chart of another vehicle positioning method, in accordance with some embodiments.

In some embodiments, the vehicle positioning method may also be used to measure a relative speed between two vehicles, referring to FIG. 12, which includes S121 and S122.

In S121, upon the first controller is in the first detection mode in response to the detection feedback signal, the first controller obtains a first position of the second vehicle relative to the first vehicle at a fifth moment, and obtains a second position of the second vehicle relative to the first vehicle at a sixth moment.

In S122, the first controller determines a relative speed of the second vehicle to the first vehicle according to a time difference between the fifth moment and the sixth moment, the first position and the second position. The time difference between the fifth moment and the sixth moment is greater than or equal to a second time threshold.

The first controller takes the first position as a first target point and the second position as a second target point, obtains a distance between the first target point and the second target point as a moving distance, obtains the time difference between the third moment and the fourth moment as a second time difference, calculates a quotient of the movement distance and the second time difference, and takes a result of the quotient as the relative speed of the second vehicle to the first vehicle, i.e., a speed of the second vehicle relative to the first vehicle.

In addition, in a case where a signal sent by a beacon node carries position information of the beacon node, more information related to driving of the vehicle, such as a direction of the vehicle head, may be determined according to the received position information of the beacon nodes, so as to provide convenience for a driver in a driving process.

In some embodiments, the detection feedback signal sent by the target beacon node carries an identifier of the second vehicle. Before the first controller obtains the second position of the second vehicle relative to the first vehicle at the sixth moment, referring to FIG. 12, the following steps may further be performed.

In S120, the first controller determines whether the identifier of the second vehicle carried by the detection feedback signal received at the fifth moment is the same as the identifier of the second vehicle carried by the detection feedback signal received at the sixth moment. If so, steps of S121 to S122 are performed; and if not, this process is ended.

As described in the above embodiments, there may be many vehicles around a vehicle during a running process. The first vehicle may detect relative positions of itself (the first vehicle) and all surrounding vehicles (that is, second vehicles that may exist around the first vehicle). Therefore, only when the first controller determines that the position information of the second vehicle (relative to the first vehicle) obtained at the fifth moment and the sixth moment belongs to the same second vehicle, the first controller determines a movement speed of the second vehicle relative to the first vehicle.

In some embodiments of the present disclosure, the vehicle positioning method further includes: after the first controller synchronously controls each first beacon node to send its corresponding detection initial signal, determining, by the first controller, that the detection feedback signal from the second vehicle is not received within a second preset time, so that the first controller is in the invitation mode.

If the first controller does not receive the detection feedback signal from the second vehicle within the second preset time, it may be considered that within the second preset time after the first controller synchronously controls each first beacon node to send its corresponding detection initial signal, there is no second vehicle around the first vehicle, or a distance between the second vehicle and the first vehicle is greater than a preset distance that needs to be detected. In this case, the first controller is in the invitation mode and continues to detect the second vehicle around the first vehicle. The preset distance may be set by those skilled in the art according to actual situations, which is not limited in the embodiments of the present disclosure.

In some embodiments, after the first controller synchronously controls each first beacon node to send its corresponding detection signal to be responded, the first controller determines that the detection response signal from the second vehicle is not received within the second preset time, so that the first controller is in the invitation mode.

A relative position between vehicles is always changing during running. If the second vehicle drives away from the preset distance relative to the first vehicle, after the first controller synchronously controls each first beacon node to send its corresponding detection initial signal and the second controller of the second vehicle controls the target beacon node to send the detection feedback signal. In this case, the first controller can continue to synchronously control each first beacon node to send its corresponding detection signal to be responded, but the detection response signal from the second vehicle cannot be received within the second preset time. In this case, the first controller is in the invitation mode.

After controlling the target beacon node to send the detection feedback signal or the detection response signal, the second controller determines that the detection signal to be responded from the first vehicle is not received within a third preset time, so that the second controller is in an invitation mode.

The relative position between vehicles is always changing during running. After the second controller controls the target beacon node to send the detection feedback signal or the detection response signal, if the second vehicle is far away from the first vehicle, the second controller cannot receive the detection signal to be responded from the first vehicle within the third preset time. In this case, the second controller is in the invitation mode.

Figure 13:
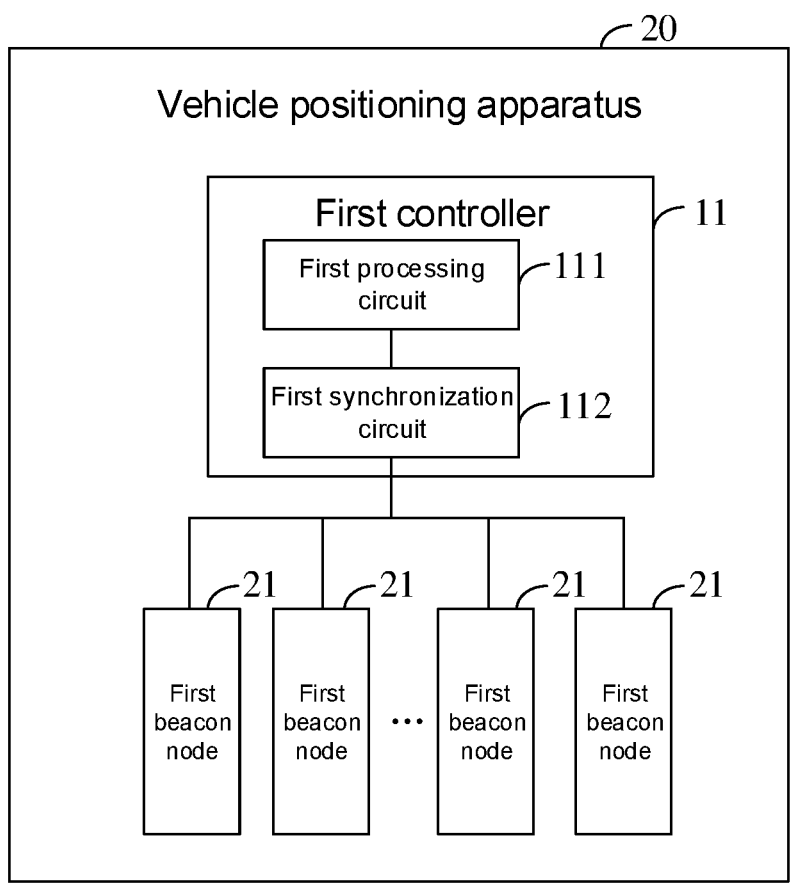
FIG. 13 is a block diagram showing a functional structure of a vehicle positioning apparatus, in accordance with some embodiments.

The embodiments of the present disclosure further provide a vehicle positioning apparatus, which is installed on a first vehicle. As shown in FIG. 13, the vehicle positioning apparatus 20 includes a first controller 11 and at least four first beacon nodes 21, and the first control 11 is coupled to the at least four first beacon nodes 21. For the at least four first beacon nodes 21 and the arrangement thereof on the first vehicle, reference may be made to corresponding descriptions in the above embodiments about the at least four beacon nodes and the arrangement thereof on the vehicle, which will not be repeated here. The first controller 11 includes a first synchronization circuit 112 and a first processing circuit 111.

Figure 14:
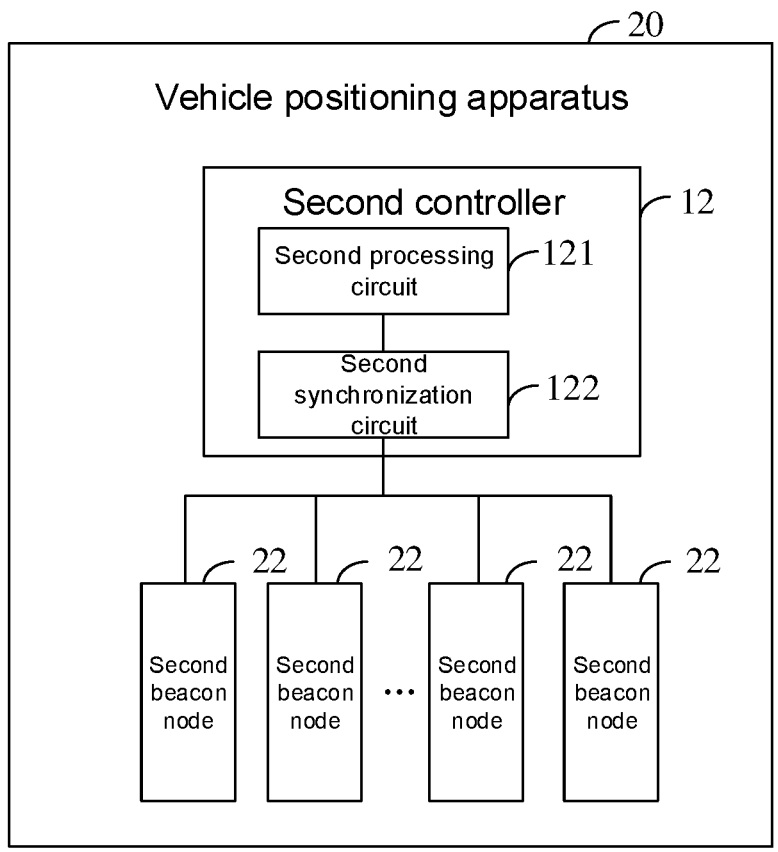
FIG. 14 is a block diagram showing a functional structure of another vehicle positioning apparatus, in accordance with some embodiments.

The embodiments of the present disclosure further provide another vehicle positioning apparatus 20, which is installed on a second vehicle. As shown in FIG. 14, the vehicle positioning apparatus 20 includes a second controller 12 and at least four second beacon nodes 22, and the second controller 12 is coupled to the at least four second beacon nodes 22. For the at least four second beacon nodes 22 and the arrangement thereof on the second vehicle, reference may be made to corresponding descriptions in the above embodiments about the at least four beacon nodes and the arrangement thereof on the vehicle, which will not be repeated here. The second controller 12 includes a second synchronization circuit 122 and a second processing circuit 121.

The first synchronization circuit 112 of the first controller 11 is coupled to the at least four first beacon nodes 21, and is configured to synchronously control each first beacon node 21 to send a corresponding detection initial signal.

The first processing circuit 111 of the first controller 11 is configured to be in an invitation mode upon being started, and trigger the first synchronization circuit 112 to synchronously control each first beacon node 21 to send its corresponding detection initial signal every other first preset duration.

Correspondingly, the second synchronization circuit 122 of the second controller 12 is coupled to the at least four second beacon nodes 22, and is configured to control each second beacon node 22 to receive detection initial signals from the first vehicle, and send the detection initial signals to the second processing circuit 121.

The second processing circuit 121 of the second controller 12 is configured to receive the detection initial signals from the second synchronization circuit 122, and select at least one second beacon node that receives at least m detection initial signals from all the second beacon nodes 22 as at least one second beacon node to be detected; determine a target beacon node according to signal parameters of the detection initial signals received by each selected second beacon node to be detected; preprocess detection initial signals received by the target beacon node, and trigger the second synchronization circuit 122 to control the target beacon node to send a detection feedback signal, so that the second controller is in a second detection mode; where m is a positive integer greater than or equal to 3, and the signal parameters include at least signal strengths of the detection initial signals.

Next, the first synchronization circuit 112 of the first controller 11 is further configured to control each first beacon node 21 to receive the detection feedback signal from the second vehicle and send the detection feedback signal to the first processing circuit 111.

The first processing circuit 111 of the controller 11 is further configured to determine that at least m first beacon nodes 21 receive the detection feedback signal, so that the first controller is in a first detection mode in response to the detection feedback signal; trigger the first synchronization circuit 112 to synchronously control each first beacon node 21 to send a corresponding detection signal to be responded according to a preset rule, record a first moment when each first beacon node 21 sends the corresponding detection signal to be responded; and take each first beacon node 21 receiving the detection feedback signal as a test first beacon node, where m is a positive integer greater than or equal to 3.

Correspondingly, the second synchronization circuit 122 of the second controller 12 is further configured to control the target beacon node to receive detection signals to be responded from the first vehicle and send the detection signals to be responded to the second processing circuit 121.

The second processing circuit 121 of the second controller 12 is further configured to trigger the second synchronization circuit 122 to control the target beacon node to send a corresponding detection response signal according to a preprocessing result of detection initial signals and the detection signals to be responded received by the target beacon node based on the preset rule.

Next, the first synchronization circuit 112 of the first controller 11 is further configured to control each test first beacon node to receive the detection response signal from the target beacon node of the second vehicle, and send the detection response signal to the first processing circuit 111.

The first processing circuit 111 of the first controller 11 is further configured to record a second moment when each test first beacon node 21 receives the detection response signal corresponding to the detection signal to be responded sent by the test first beacon node 21; determine a distance between each test first beacon node and the target beacon node according to the first moment and the second moment that are corresponding to each test first beacon node, so as to determine a position of the target beacon node relative to the first vehicle.

In the embodiments of the present disclosure, position information of other vehicles may be detected by the vehicle positioning apparatus installed on the vehicles, and there is no need to take image information during a monitoring process, which is not affected by factors such as light, and may ensure an accuracy of a monitoring result.

There are also various ways for the first controller to detect the distance between each test first beacon node and the target beacon node. Below, two ways of detecting the distance between the first beacon node and the target beacon node are exemplarily listed.

In some embodiments, the detection initial signal carries a first node identifier of the first beacon node that sends the detection initial signal. The second processing circuit 121 of the second controller 12 is further configured to obtain the first node identifiers carried by the detection initial signals received by the target beacon node; trigger the second synchronization circuit 122 to control the target beacon node to send the detection feedback signal, the detection feedback signal carrying the first node identifier carried by each detection initial signal received by the target beacon node.

Then the first processing circuit 111 of the first controller 11 is configured to trigger the first synchronization circuit 112 to synchronously control each first beacon node 21 to send its corresponding detection signal to be responded according to the preset rule, and in the first detection mode, the number of times that the first processing circuit 111 triggers the first synchronization circuit 112 to perform the synchronization control action is one.

Correspondingly, the detection signal to be responded sent by the first beacon node 21 carries the first node identifier of the first beacon node 21 that sends the detection signal to be responded. The second processing circuit 121 of the second controller 12 is further configured to:

obtain first node identifiers carried by the detection signal to be responded received by the target signal node;

start preset threads corresponding to the detection signals to be responded in response to the received detection signals to be responded sent by the first beacon nodes in sequence according to a time sequence of the target signal node receiving the detection signals to be responded sent by the first beacon nodes. The preset thread includes:

starting timekeeping, and obtaining a first node identifier carried by a detection signal to be responded;

determining whether the first node identifier currently obtained exists in the first node identifiers carried by the detection initial signals;

If so, i.e., when it is determined that the first node identifier currently obtained exists in the first node identifiers carried by the detection initial signals, triggering the second synchronization circuit to control the target beacon node to send the detection response signal when the timekeeping reaches a preset duration, the detection response signal carrying a node identifier of the target beacon node and the first node identifier currently obtained; and deleting the first node identifier currently obtained.

Next, the first processing circuit 111 of the first controller 11 is further configured to: for each test first beacon node, determine whether the node identifier of the test first beacon node is matched with the first node identifier carried by the detection response signal received by the test first beacon node; when matching is determined, record the second moment when the test first beacon node receives the corresponding detection response signal.

In the above embodiment, the first processing circuit 111 controls each first beacon node 21 to send a corresponding detection signal to be responded once; and the second processing circuit 121 controls the target beacon node to sequentially respond to each detection signal to be responded received by the target beacon node according to the time sequence of the target beacon node receiving the detection signals to be responded. Then the first processing circuit 111 of the first controller 11 determines a distance between each test first beacon node and the target beacon node according to the first moment and the second moment corresponding to each test first beacon node.

In some other embodiments, the detection initial signal carries the first node identifier of the first beacon node that sends the detection initial signal. The second processing circuit 121 of the second controller 12 is further configured to obtain the first node identifiers carried by the detection initial signals received by the target beacon node, sequence the first node identifiers to obtain a sequencing result; and trigger the second synchronization circuit 112 to control the target beacon node to send the detection feedback signal carrying the sequencing result.

Next, the first processing circuit 111 of the first controller 11 is configured to control each test first beacon node to receive the detection feedback signal sent by the target beacon node, obtain the sequencing result in the detection feedback signal; respond to the detection feedback signal to be in the first detection mode, and trigger the first synchronization circuit 112 to synchronously control each test first beacon node to send its corresponding detection signal to be responded according to the preset rule. In the first detection mode, the number of times that the first processing circuit 111 triggers the first synchronization circuit 112 to perform the synchronization control action is m.

Correspondingly, the second processing circuit 121 of the second controller 12 is configured to obtain the first node identifiers carried by the detection signals to be responded received by the target beacon node; start timekeeping when it is determined that the first node identifier currently obtained is sequenced at a k-th position in the sequencing result; trigger the second synchronization circuit 112 to control the target beacon node to send the detection response signal when the timekeeping reaches the preset duration, the detection response signal carrying the node identifier of the target beacon node; where k takes a value in a positive integer set of [1, m] in sequence.

Next, the first processing circuit 111 of the first controller 11 is configured to: after triggering the first synchronization circuit to perform the synchronization control action for a k-th time in the first detection mode, record the second moment when the test first beacon node to which the first node identifier sequenced at the k-th position in the sequencing result belongs receives the detection response signal.

In the above embodiments, the first processing circuit 111 controls each first beacon node 21 to send a corresponding detection signal to be responded m times. The second processing circuit 121 controls the target beacon nodes to sequentially respond to the detection signals to be responded received by the target beacon node and sequenced at the k-th position according to the sequencing result. Then, the first processing circuit 111 of the first controller 11 determines the distance between each test first beacon node and the target beacon node according to the first moment and the second moment corresponding to each test first beacon node.

In some embodiments, after the second processing circuit 121 of the second controller 12 controls the target signal node to sequentially respond to the detection signals to be responded sent by the test first beacon nodes, the second processing circuit 121 of the second controller 12 takes each remaining second beacon nodes to be detected as the target beacon node in sequence.

Then, the first controller determines a position of each remaining second beacon node to be detected relative to the first vehicle according to each target beacon node determined by the second controller.

The first processing circuit 111 of the first controller 11 obtains position information of the second vehicle relative to the first vehicle according to a position of each second beacon node to be detected relative to the first vehicle.

By utilizing the above functions, the first controller may determine a specific position of the second vehicle relative to the first vehicle, so as to determine a position of the second vehicle and a size of the second vehicle for a driver.

In some embodiments, the detection feedback signal sent by the target beacon node carries the identifier of the second vehicle. The first processing circuit 111 of the first controller 11 is configured to: determine whether the identifier of the second vehicle carried by the detection feedback signal received by the first processing circuit 111 at a third moment is the same as the identifier of the second vehicle carried by the detection feedback signal received by the first processing circuit 111 at a fourth moment; if so, determine a movement direction of the second vehicle relative to the first vehicle according to a distance value between each first beacon node and the second vehicle at the third moment and a distance value between each first beacon node and the second vehicle at the fourth moment. A first time difference between the third moment and the fourth moment is less than a first time threshold.

By utilizing the above functions, a purpose of determining the movement direction of the second vehicle relative to the first vehicle may be realized, which is convenient for the driver to take corresponding driving behaviors in time. For example, when the second vehicle is moving in a direction proximate to the first vehicle, the driver may consider whether it is necessary to avoid the second vehicle.

In some embodiments, the detection feedback signal sent by the target beacon node carries the identifier of the second vehicle. The first processing circuit 111 of the first controller 11 is configured to: obtain a first position of the second vehicle relative to the first vehicle at a fifth moment, obtain a second position of the second vehicle relative to the first vehicle at a sixth moment. The first controller determines a relative speed of the second vehicle to the first vehicle according to the first position, the second position and a time difference between the fifth moment and the sixth moment. A time difference between the fifth moment and the sixth moment is greater than or equal to a second time threshold.

By utilizing the above functions, a movement speed of the second vehicle relative to the first vehicle may be detected, and a movement speed of the second vehicle is determined according to a movement speed of the first vehicle itself, so as to facilitate the driver to take corresponding driving behaviors in time. For example, when it is detected that the second vehicle is in front of the first vehicle and the movement speed of the second vehicle is lower than the movement speed of the first vehicle, the driver may consider whether it is necessary to decelerate.

In some embodiments, the detection initial signal and the detection signal to be responded that are sent by the first beacon node and the detection feedback signal and the detection response signal that are sent by the second beacon node each have a pulse duration of 100 ps to 2 ns, so as to ensure an accuracy of a monitoring result and achieve centimeter-level positioning accuracy.

It will be noted that in the description of the above embodiments, the functions of the first controller 110 and the second controller 120 are described separately, and the functions of the two are different. In practical applications, in order to enable a target vehicle to be able to measure a distance between itself and surrounding vehicles (tested vehicles), and to be also able to be used as a tested vehicle to be measured by other vehicles, the controller of the vehicle positioning apparatus installed on the target vehicle may have functions of the first controller and the second controller. In this case, regardless of the target vehicle or the tested vehicle, the controller included in the vehicle provided with the vehicle positioning apparatus has the same functions, and has the functions of the first controller and the second controller, so that the vehicle provided with the vehicle positioning apparatus may be used as the target vehicle (i.e., the first vehicle) and the tested vehicle (i.e., the second vehicle).

All relevant content of the steps involved in the above method embodiments may be cited in functional descriptions of corresponding functional modules, and the functions of which will not be repeated here.

In a case of using an integrated circuit, the vehicle positioning apparatus in the embodiments of the present disclosure includes a storage unit, a processing unit and an interface unit. The processing unit is used to control and manage processing actions of the vehicle positioning apparatus. For example, the processing unit is configured to support the vehicle positioning apparatus to perform steps in FIGS. 4, 6, 7, 11 and 12, and steps in the above vehicle positioning method that are not shown in the drawings. The interface unit is configured for interaction between the vehicle positioning apparatus and other apparatuses. The storage unit is configured to store codes and data of the vehicle positioning apparatus.

Figure 15:
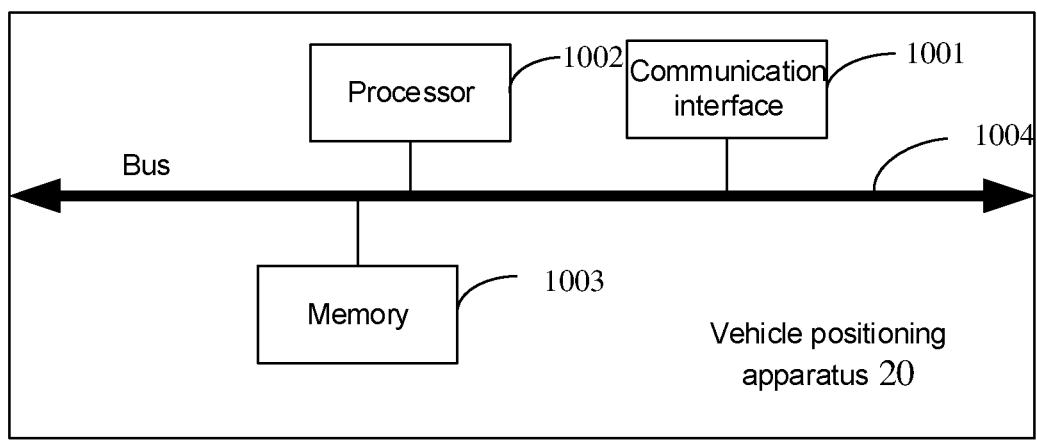
FIG. 15 is a schematic diagram showing a structure of a vehicle positioning apparatus, in accordance with some embodiments.

For example, the processing unit is a processor, the storage unit is a memory, and the interface unit is a communication interface. As shown in FIG. 15, the vehicle positioning apparatus 20 in the embodiments of the present disclosure includes a communication interface 1001, a processor 1002, a memory 1003 and a bus 1004. The communication interface 1001 and the processor 1002 are connected to the memory 1003 through the bus 1004.

The processor 1002 may be a central processing unit (CPU), a microprocessor, an application-specific integrated circuit (ASIC), or one or more integrated circuits for controlling program execution of the solutions of the present disclosure.

The memory may be a read-only memory (ROM) or any other type of static storage device that may store static information and instructions, a random access memory (RAM) or any other type of dynamic storage device that may store information and instructions, or an electrically erasable programmable read-only memory (EEPROM), a compact disc read-only memory (CD-ROM), or any other compact disc storage device or optical disk storage device (including a compact disc, a laser disc, an optical disc, a digital versatile disc, a blu-ray disc, etc.), a magnetic disc storage medium or any other magnetic storage device, or any other medium that may be used to carry or store desired program codes in a form of instructions or data structures and can be accessed by a computer, which is not limited thereto. The memory may be a separate memory connected to the processor through the bus. The memory may also be integrated with the processor.

The memory 1003 is used for storing application program codes for executing the solutions of the present disclosure, and is controlled for execution by the processor 1002. The communication interface 1001 is used to support interaction between the vehicle positioning apparatus 20 and other apparatuses. The processor 1002 is used to execute the application program codes stored in the memory 1003, so as to implement the method in the embodiments of the present disclosure.

Figure 16:
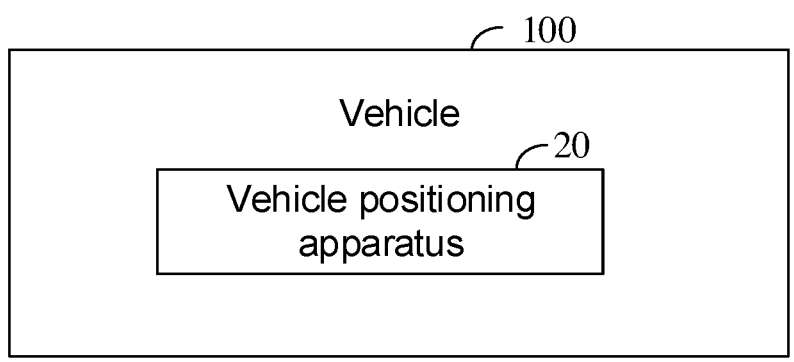
FIG. 16 is a block diagram showing a functional structure of a vehicle, in accordance with some embodiments.

Referring to FIG. 16, some embodiments of the present disclosure further provide a vehicle 100, and the vehicle 100 provided by the embodiments of the present disclosure includes the vehicle positioning apparatus 20. For an arrangement manner of the vehicle positioning apparatus 20 on the vehicle 100, reference may be made to a corresponding description in the above method embodiments, which will not be repeated here.

The steps of the method or algorithm described in conjunction with the present disclosure may be implemented in a hardware manner, or may be implemented in a manner in which a processor executes software instructions. The embodiments of the present disclosure further provides a storage medium, which may include a memory for storing computer instructions used by the vehicle positioning apparatus, and the computer instructions include program codes designed to perform a device management method. The software instructions may be composed of corresponding software modules that may be stored in a random access memory (RAM), a flash memory, a read only memory (ROM), an erasable programmable read only memory (EPROM), an electrically erasable programmable read only memory (EEPROM), a register, a hard disk, a removable hard disk, a compact disc read-only memory (CD-ROM), or any other form of storage medium known in the art. An exemplary storage medium is coupled to the processor to enable the processor to read information from the storage medium and write information to the storage medium. Of course, the storage medium may also be an integral part of the processor.

Some embodiments of the present disclosure provide a non-transitory computer-readable storage medium having stored computer program instructions that, when run by the processor, one or more steps in the vehicle positioning method of any of the above embodiments are performed. The foregoing storage medium includes any medium that may store program codes, such as ROM, RAM, a magnetic disk or an optical disk.

Some embodiments of the present disclosure also provide a computer program product. The computer program product includes computer program instructions that, when executed on a computer, cause the computer to perform one or more steps in the vehicle positioning method described in any of the above embodiments.

Some embodiments of the present disclosure also provide a computer program. When executed on the computer, the computer program causes the computer to perform one or more steps in the vehicle positioning method described in any of the above embodiments.

It can be understood that, the non-transitory computer readable storage media, the computer program product and the computer program are capable of achieving the effects of the above vehicle positioning method, which will not be repeated here.

The forgoing descriptions are merely specific implementation manners of the present disclosure, but the protection scope of the present disclosure is not limited thereto. Changes or replacements that any person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A vehicle positioning method applied to vehicles each provided with a vehicle positioning apparatus, a vehicle positioning apparatus including a controller and at least four beacon nodes coupled thereto, and at least each of four corners of a vehicle being provided with one beacon node thereon, wherein the vehicle positioning method is used to determine a position of a second vehicle relative to a first vehicle; the controller of the vehicle positioning apparatus provided on the first vehicle is a first controller, and the at least four beacon nodes of the vehicle positioning apparatus provided on the first vehicle are at least four first beacon nodes; and the controller of the vehicle positioning apparatus provided on the second vehicle is a second controller, and the at least four beacon nodes of the vehicle positioning apparatus provided on the second vehicle are at least four second beacon nodes; and the vehicle positioning method comprises:

synchronously controlling, by the first controller, each of the at least four first beacon nodes to send a corresponding detection initial signal every other first preset time when the first controller is in an invitation mode upon being started;

selecting, by the second controller, at least one second beacon node each receiving at least m detection initial signals from all the second beacon nodes as at least one second beacon node to be detected, wherein m is a positive integer greater than or equal to 3;

determining, by the second controller, a target beacon node according to signal parameters of the detection initial signals received by each selected second beacon node to be detected, wherein the signal parameters include at least signal strengths of the detection initial signals;

preprocessing, by the second controller, the detection initial signals received by the target beacon node;

controlling, by the second controller, the target beacon node to send a detection feedback signal, so that the second controller is in a second detection mode;

determining, by the first controller, that at least m first beacon nodes receive the detection feedback signal, so that the first controller is in a first detection mode in response to the detection feedback signal;

synchronously controlling, by the first controller, each of the at least four first beacon nodes to send a corresponding detection signal to be responded according to a preset rule;

recording, by the first controller, a first moment when each of the at least four first beacon nodes sends the corresponding detection signal to be responded;

taking, by the first controller, each of the at least m first beacon nodes receiving the detection feedback signal as a test first beacon node;

controlling, by the second controller, the target beacon node to send a detection response signal corresponding to each test first beacon node according to a preprocessing result of the detection initial signals and detection signals to be responded received by the target beacon node based on the preset rule;

recording, by the first controller, a second moment when each test first beacon node receives the corresponding detection response signal; and determining, by the first controller, a distance between each test first beacon node and the target beacon node according to the first moment and the second moment that are corresponding to each test first beacon node, so as to determine a position of the target beacon node relative to the first vehicle.

2. The vehicle positioning method according to claim 1, wherein the detection initial signal sent by the first beacon node carries a first node identifier of the first beacon node that sends the detection initial signal; and preprocessing, by the second controller, the detection initial signals received by the target beacon node, includes:

obtaining, by the second controller, first node identifiers carried by the detection initial signals.

3. The vehicle positioning method according to claim 2, wherein synchronously controlling, by the first controller, each of the at least four first beacon nodes to send the corresponding detection signal to be responded according to the preset rule, includes:

synchronously controlling, by the first controller, each of the at least four first beacon nodes to send the corresponding detection signal to be responded once in the first detection mode, wherein the detection signal to be responded carries the first node identifier of the first beacon node that sends the detection signal to be responded.

4. The vehicle positioning method according to claim 3, wherein controlling, by the second controller, the target beacon node to send the detection response signal corresponding to each test first beacon node according to the preprocessing result of the detection initial signals and the detection signals to be responded received by the target beacon node based on the preset rule, includes:

after the first controller synchronously controls each of the at least four first beacon nodes to send the corresponding detection signal to be responded once in the first detection mode, sequentially in response to the received detection signals to be responded sent by the at least four first beacon nodes, starting, by the second controller, preset threads corresponding to the detection signals to be responded according to a time sequence of the target beacon node receiving the detection signals to be responded sent by the at least four first beacon nodes, wherein a preset thread includes:

starting timekeeping, and obtaining the first node identifier carried by the detection signal to be responded;

determining whether the first node identifier currently obtained exists in the first node identifiers carried by the detection initial signals;

in response to determining that the first node identifier currently obtained exists in the first node identifiers carried by the detection initial signals, controlling the target beacon node to send the detection response signal when the timekeeping reaches a preset duration, the detection response signal carrying a node identifier of the target beacon node and the first node identifier currently obtained; and deleting the first node identifier currently obtained.

5. The vehicle positioning method according to claim 4, wherein recording, by the first controller, the second moment when each test first beacon node receives the corresponding detection response signal, includes:

for each test first beacon node, determining, by the first controller, whether a first node identifier of the test first beacon node is matched with the first node identifier carried by the detection response signal received by the test first beacon node;

in response to determining that the first node identifier of the test first beacon node is matched with the first node identifier carried by the detection response signal received by the test first beacon node, recording, by the first controller, the second moment when the test first beacon node receives the corresponding detection response signal.

6. The vehicle positioning method according to claim 1, wherein the detection initial signal sent by the first beacon node carries a first node identifier of the first beacon node that sends the detection initial signal; and preprocessing, by the second controller, the detection initial signals received by the target beacon node, and controlling, by the second controller, the target beacon node to send the detection feedback signal, includes:

obtaining, by the second controller, first node identifiers carried by the detection initial signals;

sequencing, by the second controller, the obtained first node identifiers to obtain a sequencing result; and controlling, by the second controller, the target beacon node to send the detection feedback signal carrying the sequencing result.

7. The vehicle positioning method according to claim 6, wherein synchronously controlling, by the first controller, each of the at least four first beacon nodes to send the corresponding detection signal to be responded according to the preset rule, includes:

synchronously controlling, by the first controller, each of the at least four first beacon nodes to send the corresponding detection signal to be responded at least m times in the first detection mode, wherein the detection signal to be responded carries the first node identifier of the first beacon node that sends the detection signal to be responded.

8. The vehicle positioning method according to claim 7, wherein controlling, by the second controller, the target beacon node to send the detection response signal corresponding to each test first beacon node according to the preprocessing result of the detection initial signals and the detection signals to be responded received by the target beacon node based on the preset rule, includes:

after the first controller synchronously controls each of the at least four first beacon nodes to send the corresponding detection signal to be responded a k-th time in the first detection mode, obtaining, by the second controller, first node identifiers carried by the detection signals to be responded received by the target beacon node;

starting, by the second controller, timekeeping when determining that a first node identifier currently obtained is sequenced at a k-th position in the sequencing result;

controlling, by the second controller, the target beacon node to send the detection response signal when the timekeeping reaches a preset duration, the detection response signal carrying a node identifier of the target beacon node, wherein k takes a value in a positive integer set of [1, m] in sequence.

9. The vehicle positioning method according to claim 8, wherein recording, by the first controller, the second moment when each test first beacon node receives the corresponding detection response signal, includes:

obtaining, by the first controller, the sequencing result carried by the detection feedback signal; and recording, by the first controller, the second moment when a test first beacon node to which the first node identifier sequenced at the k-th position in the sequencing result belongs receives the detection response signal.

10. The vehicle positioning method according to claim 1, wherein the at least one second beacon node to be detected includes a plurality of second beacon nodes to be detected; after the first controller determines the position of the target beacon node relative to the first vehicle, the method further comprises:

taking, by the second controller, each remaining second beacon node to be detected on the second vehicle as the target beacon node;

determining, by the first controller, a position of each remaining second beacon node to be detected relative to the first vehicle according to each target beacon node determined by the second controller; and obtaining, by the first controller, position information of the second vehicle relative to the first vehicle according to the position of each second beacon node to be detected relative to the first vehicle.

11. The vehicle positioning method according to claim 10, wherein the first controller is in the invitation mode after obtaining the position information of the second vehicle relative to the first vehicle.

12. The vehicle positioning method according to claim 1, wherein after the first controller synchronously controls each of the at least four first beacon nodes to send the corresponding detection initial signal, the method further comprises:

determining, by the second controller, whether second beacon nodes receiving less than m detection initial signals exist among all the second beacon nodes;

in response to determining that the second beacon nodes receiving less than m detection initial signals exist among all the second beacon nodes, selecting, by the second controller, two second beacon nodes receiving two detection initial signals from all the second beacon nodes as two second beacon nodes to be detected, and controlling, by the second controller, the two second beacon nodes to be detected to send detection feedback signals;

taking, by the first controller, two first beacon nodes receiving the detection feedback signals sent by the two second beacon nodes to be detected as two test first beacon nodes to detect a distance value between each of the two test first beacon nodes and each of the two second beacon nodes to be detected;

calculating, by the first controller, a deflection angle of the second vehicle relative to the first vehicle according to the detected distance value, a distance value between the two test first beacon nodes and a distance value between the two second beacon nodes to be detected; and obtaining, by the first controller, position information of the second vehicle relative to the first vehicle according to the detected distance value, the calculated deflection angle, and a pre-associated position relationship between all the second beacon nodes provided on the second vehicle.

13. The vehicle positioning method according to claim 1, wherein after the first controller is in the first detection mode in response to the detection feedback signal, the method further comprises:

obtaining, by the first controller, distance values between each of the at least four first beacon nodes and the second vehicle at a third moment and a fourth moment; and determining, by the first controller, a movement direction of the second vehicle relative to the first vehicle according to a distance value between each of the at least four first beacon nodes and the second vehicle at the third moment and a distance value between each of the at least four first beacon nodes and the second vehicle at the fourth moment, wherein a time difference between the third moment and the fourth moment is less than a first time threshold.

14. The vehicle positioning method according to claim 13, wherein the detection feedback signal sent by the target beacon node carries an identifier of the second vehicle;

before the first controller obtains the distance value between each of the at least four first beacon nodes and the second vehicle at the fourth moment, the method further comprises:

determining, by the first controller, whether the identifier of the second vehicle carried by the detection feedback signal received at the third moment is the same as the identifier of the second vehicle carried by the detection feedback signal received at the fourth moment;

determining, by the first controller, the movement direction of the second vehicle relative to the first vehicle according to the distance value between each of the at least four first beacon nodes and the second vehicle at the third moment and the distance value between each of the at least four first beacon nodes and the second vehicle at the fourth moment, includes:

in response to determining that the identifier of the second vehicle carried by the detection feedback signal received at the third moment is the same as the identifier of the second vehicle carried by the detection feedback signal received at the fourth moment, determining, by the first controller, the movement direction of the second vehicle relative to the first vehicle according to the distance value between each of the at least four first beacon nodes and the second vehicle at the third moment and the distance value between each of the at least four first beacon nodes and the second vehicle at the fourth moment.

15. The vehicle positioning method according to claim 1, wherein after the first controller is in the first detection mode in response to the detection feedback signal, the method further comprises:

obtaining, by the first controller, a first position of the second vehicle relative to the first vehicle at a fifth moment;

obtaining, by the first controller, a second position of the second vehicle relative to the first vehicle at a sixth moment; and determining, by the first controller, a relative speed of the second vehicle to the first vehicle according to the first position, the second position, and a time difference between the fifth moment and the sixth moment, wherein the time difference between the fifth moment and the sixth moment is greater than or equal to a second time threshold.

16. The vehicle positioning method according to claim 15, wherein the detection feedback signal sent by the target beacon node carries an identifier of the second vehicle;

before the first controller obtains the second position of the second vehicle relative to the first vehicle at the sixth moment, the method further comprises:

determining, by the first controller, whether the identifier of the second vehicle carried by the detection feedback signal received at the fifth moment is the same as the identifier of the second vehicle carried by the detection feedback signal received at the sixth moment;

determining, by the first controller, the relative speed of the second vehicle to the first vehicle according to the first position, the second position, and the time difference between the fifth moment and the sixth moment, includes:

in response to determining that the identifier of the second vehicle carried by the detection feedback signal received at the fifth moment is the same as the identifier of the second vehicle carried by the detection feedback signal received at the sixth moment, determining, by the first controller, the relative speed of the second vehicle to the first vehicle according to the first position, the second position, and the time difference between the fifth moment and the sixth moment.

17. The vehicle positioning method according to claim 1, further comprising:

after the first controller synchronously controls each of the at least four first beacon nodes to send the corresponding detection initial signal, determining, by the first controller, that the detection feedback signal from the target beacon node on the second vehicle is not received within a second preset time, so that the first controller is in the invitation mode; and after the first controller synchronously controls each of the at least four first beacon nodes to send the corresponding detection signal to be responded, determining, by the first controller, that the detection response signal from the target beacon node on the second vehicle is not received within the second preset time, so that the first controller is in the invitation mode.

18. The vehicle positioning method according to claim 1, further comprising:

after the second controller controls the target beacon node to send the detection feedback signal or the detection response signal, determining, by the second controller, that the detection signal to be responded from any of the at least four first beacon nodes on the first vehicle is not received within a third preset time, so that the second controller is in an invitation mode.

19. The vehicle positioning method according to claim 1, wherein the detection initial signal and the detection signal to be responded that are sent by the first beacon node, and the detection feedback signal and the detection response signal that are sent by the second beacon node each have a pulse duration of 100 ps to 2 ns.

20. A non-transitory computer-readable storage medium having stored computer program instructions that, when run by a processor, perform one or more steps in the vehicle positioning method according to claim 1.

* * * * *